United States Patent
Pedersen et al.

(10) Patent No.: US 10,592,169 B2
(45) Date of Patent: Mar. 17, 2020

(54) METHODS AND SYSTEMS THAT EFFICIENTLY STORE METRIC DATA TO ENABLE PERIOD AND PEAK DETECTION

(71) Applicant: VMware, Inc., Palo Alto, CA (US)

(72) Inventors: Paul Pedersen, Palo Alto, CA (US); Darren Brown, Seattle, WA (US); Wei Li, Palo Alto, CA (US); Leah Nutman, Palo Alto, CA (US); Sergio Nakai, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 281 days.

(21) Appl. No.: 15/822,612

(22) Filed: Nov. 27, 2017

(65) Prior Publication Data

US 2019/0163404 A1    May 30, 2019

(51) Int. Cl.
  *G06F 3/06*    (2006.01)
(52) U.S. Cl.
  CPC ............ *G06F 3/0661* (2013.01); *G06F 3/067* (2013.01); *G06F 3/0608* (2013.01); *G06F 3/0683* (2013.01)
(58) Field of Classification Search
  None
  See application file for complete search history.

(56) References Cited

U.S. PATENT DOCUMENTS

| | | | |
|---|---|---|---|
| 9,742,435 B1* | 8/2017 | Poghosyan | ......... H03M 7/3064 |
| 10,153,779 B1* | 12/2018 | Bordignon | .............. H03M 7/30 |
| 10,387,475 B2* | 8/2019 | Bhave | ................. G06F 11/3082 |
| 2017/0371872 A1* | 12/2017 | McBride | ................. G06F 3/061 |

\* cited by examiner

*Primary Examiner* — Michael Alsip

(57) ABSTRACT

The current document is directed to methods and systems that collect metric data within computing facilities, including large data centers and cloud-computing facilities. In a described implementation, input metric data is compressed by replacing each metric data point with a one-bit, two-bit, four-bit, or eight-bit compressed data value. During a first time window following reception of a metric data point, the metric data point remains available in uncompressed form to facilitate data analysis and monitoring functionalities that use uncompressed metric data. During a second time window, the metric data point is compressed and stored in memory, where the compressed data point remains available for data analysis and monitoring functionalities that use compressed metric data for detection of peaks, periodic patterns, and other characteristics. Finally, the compressed data point is archived in mass storage, where it remains available to data-analysis and management functionalities for a lengthy time period.

20 Claims, 32 Drawing Sheets

```
typedef unsigned int UNIT;              /── 2203
typedef long TIME;          ──── 2204
typedef UNIT *UNIT_PTR;                        ── 2208    ── 2209
                            ── 2205                                    ── 2210   ⎫ 2202
using transferFunction = bool(UNIT* data, int numUnits, int numEntries);          ⎭ const int BYTES_PER_UNIT = sizeof(UNIT);    ──── 2211
const int BITS_PER_UNIT = BYTES_PER_UNIT * 8;  ──── 2212              ── 2206 typedef struct internalUnitPtr
{
    int unitOffset;    ── 2214
    int bitOffset;     ──── 2215
} INTERNAL_UNIT_PTR;
                   ── 2213
class C_Queue
{
    private:
        int eSize;    ── 2221
        int numEntriesPerUnit;   ── 2222

UNIT *buffer;    ── 2223
        int bufferSize;  ──── 2224
        INTERNAL_UNIT_PTR in;  ── 2225
        INTERNAL_UNIT_PTR out; ──── 2226
        TIME initial;   ──── 2227
        TIME final;  ──── 2228
        int totalEntries;  ──── 2229
        int numEntries;  ──── 2230 transferFunction* tFunction;  ── 2231
        int tSize;     ──── 2232
        int tSizeEntries;   ──── 2233
        TIME inc;     ──── 2234 void advanceIn();    ── 2235
        void advanceOut(int num);  ──── 2236
        void enter(int offset, int val, UNIT_PTR unit);  ──── 2237
        bool transfer();   ──── 2238
        void flush();   ──── 2239 public:
        bool addEntry(int entry);   ── 2240
        bool editEntry(TIME t, int newEntry);  ── 2241   ── 2242
        int getNumEntries() {return numEntries;};  ──── 2243
        TIME getStart() {return initial;};   ──── 2244
        bool getEntries(int num, int first, int* buffer);
                                                              ── 2245
        C_Queue(int size, int entrySize, int transferSize,
                transferFunction *ptr, TIME startTime, TIME increment);
        ~C_Queue();
};                   ── 2246
```

FIG. 22A

```
C_Queue::C_Queue(int size, int entrySize, int transferSize,
                transferFunction *ptr, TIME startTime, TIME increment)
{
    eSize = entrySize;
    if (eSize > BITS_PER_UNIT || eSize < 1) throw (error(1));
    if (BITS_PER_UNIT % eSize != 0) throw (error(2));
    numEntriesPerUnit = BITS_PER_UNIT / eSize;

buffer = new UNIT[size];
    bufferSize = size;
    in.bitOffset = 0;
    in.unitOffset = 0;
    out.bitOffset = 0;
    out.unitOffset = 0;
    initial = final = startTime;
    totalEntries = size * numEntriesPerUnit;
    numEntries = 0;

tFunction = ptr;
    tSize = transferSize;
    tSizeEntries = tSize * numEntriesPerUnit;
    inc = increment;
}                                                                  ⎱ 2247

C_Queue::~C_Queue()
{
    flush();                                                       ⎱ 2248
    delete[] buffer;
} void C_Queue::advanceIn()
{
    in.bitOffset += eSize;
    if (in.bitOffset == BITS_PER_UNIT)
    {
        in.bitOffset = 0;
        in.unitOffset++;                                           ⎱ 2249
        if (in.unitOffset == bufferSize) in.unitOffset = 0;
    }
} void C_Queue::advanceOut(int num)
{
    out.unitOffset += num;                                         ⎱ 2250
    if (out.unitOffset >= bufferSize) out.unitOffset -= bufferSize;
}
```

FIG. 22B

```
void C_Queue::enter(int offset, int val, UNIT_PTR unit)
{
    int mask = 1;
    UNIT u;

mask = pow(2, eSize) - 1;       ─── 2252
    u = val & mask; ─────── 2253
    u = u << offset; ─────── 2254
    mask = mask << offset; ─────── 2255
    *unit = *unit & ~mask;  ⎫
    *unit = *unit | u;      ⎬ 2256
}
```
⎫
⎬ 2251
⎭

```
bool C_Queue::addEntry(int entry)
{
    if (numEntries == totalEntries) if (!transfer()) return false;
    enter(in.bitOffset, entry, buffer + in.unitOffset);
    advanceIn();
    final += inc;
    numEntries++;
    return true;
}
```
⎫
⎬ 2252
⎭

FIG. 22C

```
bool C_Queue::transfer()
{
    int trans, eTrans, rem, eRem;

if (numEntries >= tSize)
    {
        trans = tSize;
        eTrans = tSizeEntries;
    }                                                                    ⎫ 2262
    else
    {
        numEntries % numEntriesPerUnit == 0 ?
                trans = numEntries / numEntriesPerUnit :
                    trans = (numEntries / numEntriesPerUnit) + 1;        ⎬ 2263
        eTrans = trans * numEntriesPerUnit;
    }                                                              ⎭
                                                                     ⎬ 2264
    if ((in.unitOffset > out.unitOffset) || ((bufferSize - out.unitOffset) >= trans))
    {
        if (tFunction(buffer + out.unitOffset, trans, eTrans))
        {
            advanceOut(trans);
            initial += eTrans * inc;                                     ⎬ 2265
            numEntries -= eTrans;
            return true;
        }
        else return false;
    }
    else
    {
        rem = bufferSize - out.unitOffset;
        eRem = rem * numEntriesPerUnit;                          ⎬ 2266
        if (tFunction(buffer + out.unitOffset, rem, eRem))
        {
            advanceOut(rem);
            initial += eRem * inc;
            numEntries -= eRem;
            rem = trans - rem;
            eRem = rem * numEntriesPerUnit;                      ⎬ 2267
            if (tFunction(buffer, rem, eRem))
            {
                advanceOut(rem);
                initial += eRem * inc;
                numEntries -= eRem;
                return true;
            }
            else return false;
        }
        else return false;
    }
}
```

FIG. 22E

```
bool C_Queue::editEntry(TIME t, int newEntry)
{
    UNIT_PTR p;
    int num, numUnits, numEntsOffset;

if (t > final || t < initial || numEntries < 1) return false;
    else
    {
        num = (t - initial) / inc;
        numUnits = num / numEntriesPerUnit;
        numEntsOffset = (num % numEntriesPerUnit) * eSize;

if ((in.unitOffset > out.unitOffset) ||
                ((out.unitOffset + numUnits) < bufferSize))
                    p = buffer + numUnits;
        else p = buffer + numUnits - bufferSize + out.unitOffset;
    }
    enter(numEntsOffset, newEntry, p);           ⎯⎯ 2270
    return true;
} void C_Queue::flush()
{
    while (numEntries > 0) transfer();                     }  2271
}
```

2268 brackets the entire editEntry function; 2269 brackets the if/else block.

FIG. 22F

METHODS AND SYSTEMS THAT EFFICIENTLY STORE METRIC DATA TO ENABLE PERIOD AND PEAK DETECTION

TECHNICAL FIELD

The current document is directed to computer-system monitoring and management and, in particular, to collection, generation, and storage of metric data used for monitoring, management, and administration of computer systems.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system monitoring, management, and administration. Currently, these needs have begun to be addressed by highly capable automated data-collection, data analysis, monitoring, management, and administration tools and facilities. Many different types of automated monitoring, management, and administration facilities have emerged, providing many different products with overlapping functionalities, but each also providing unique functionalities and capabilities. Owners, managers, and users of large-scale computer systems continue to seek methods, systems, and technologies to provide secure, efficient, and cost-effective data-collection and data analysis tools and subsystems to support monitoring, management, and administration of computing facilities, including cloud-computing facilities and other large-scale computer systems.

SUMMARY

The current document is directed to methods and systems that collect metric data within computing facilities, including large data centers and cloud-computing facilities. In a described implementation, input metric data is compressed by replacing each metric data point with a one-bit, two-bit, four-bit, or eight-bit compressed data value. During a first time window following reception of a metric data point, the metric data point remains available in uncompressed form to facilitate data analysis and monitoring functionalities that use uncompressed metric data. During a second time window, the metric data point is compressed and stored in memory, where the compressed data point remains available for data analysis and monitoring functionalities that use compressed metric data for detection of peaks, periodic patterns, and other characteristics. Finally, the compressed data point is archived in mass storage, where it remains available to data-analysis and management functionalities for a lengthy time period.

BRIEF DESCRIPTION OF THE DRAWINGS

FIGS. 22A-F show a C++ implementation of the compressed-metric-data queue (1904 in FIG. 20).

DETAILED DESCRIPTION

Figure 1:
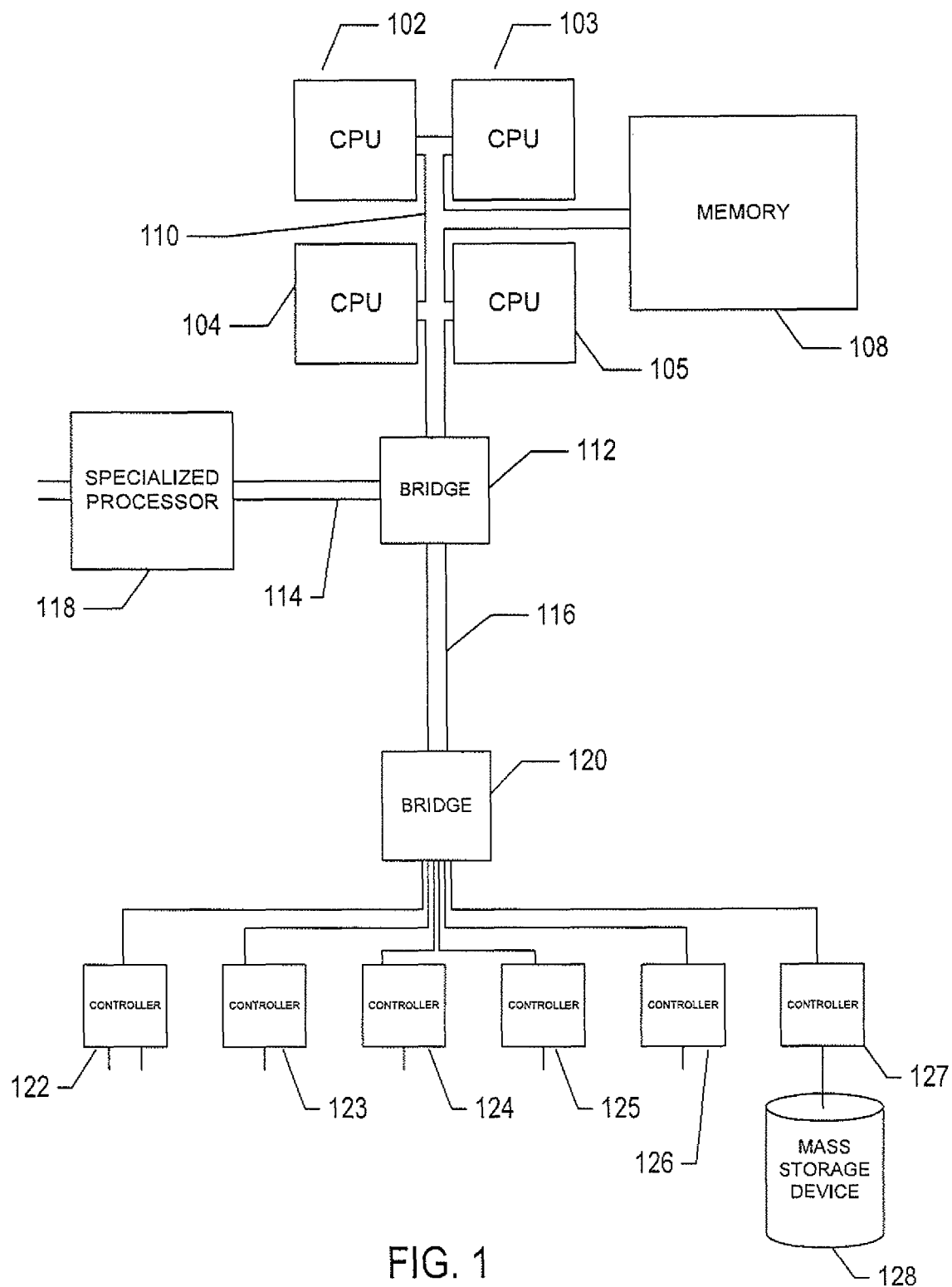
FIG. 1 provides a general architectural diagram for various types of computers.

The current document is directed to methods and systems that collect metric data within computing facilities, store the metric data for a period of time, compress the metric data, and store the compressed metric data. In a first subsection, below, a detailed description of computer hardware, complex computational systems, and virtualization is provided with reference to FIGS. 1-10. In a second subsection, the currently disclosed methods and systems for collecting and compressing metric data are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
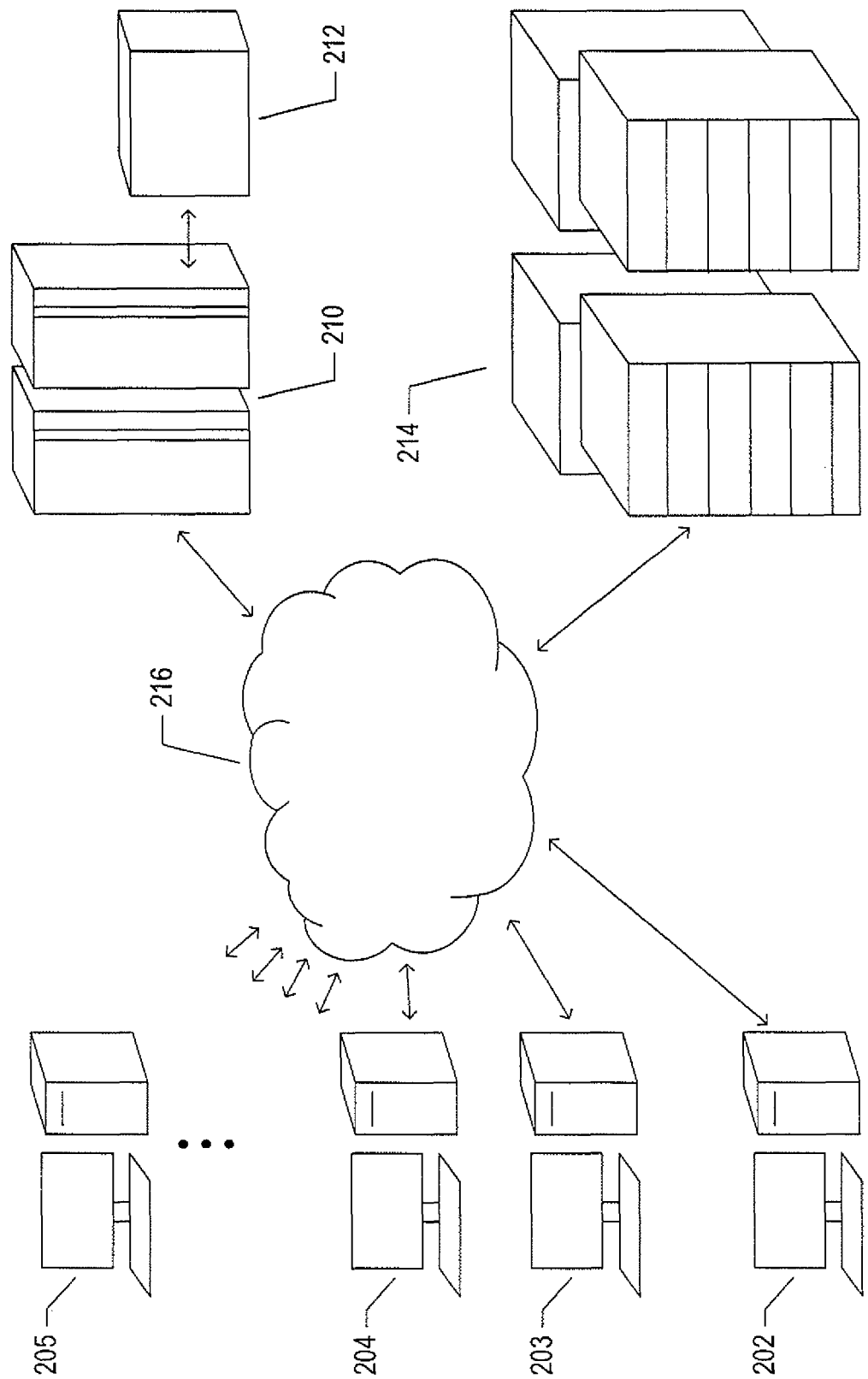
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
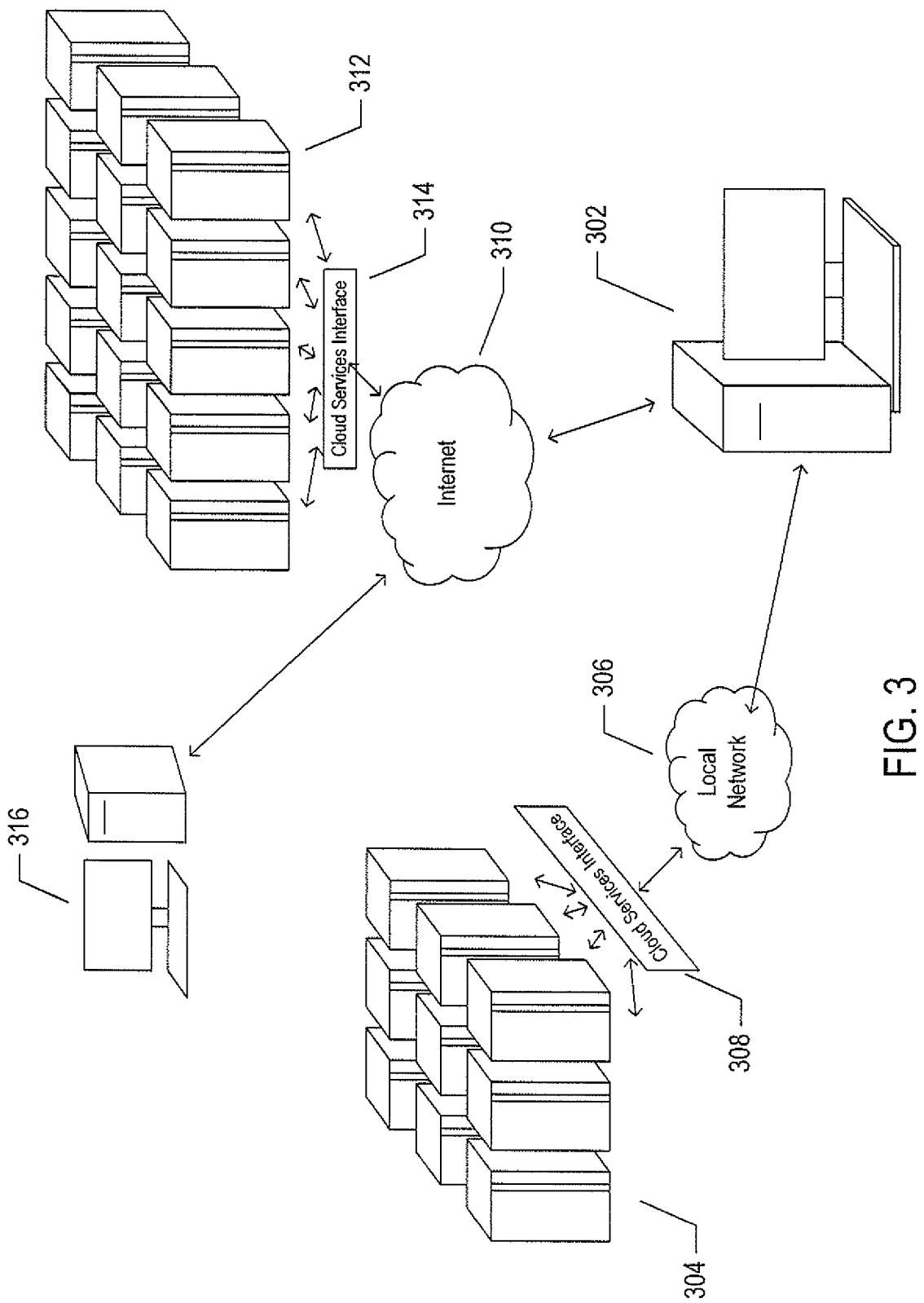
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
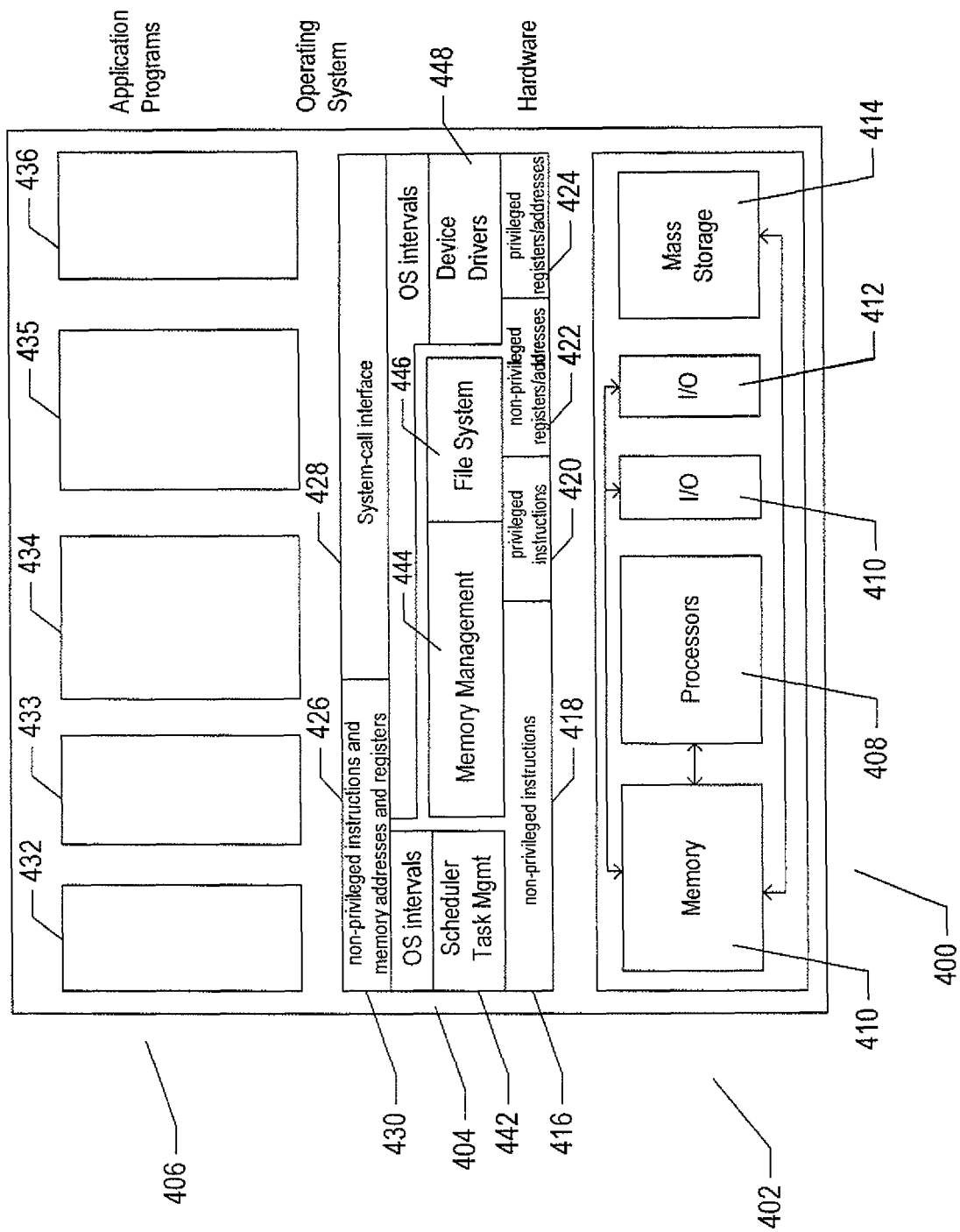
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
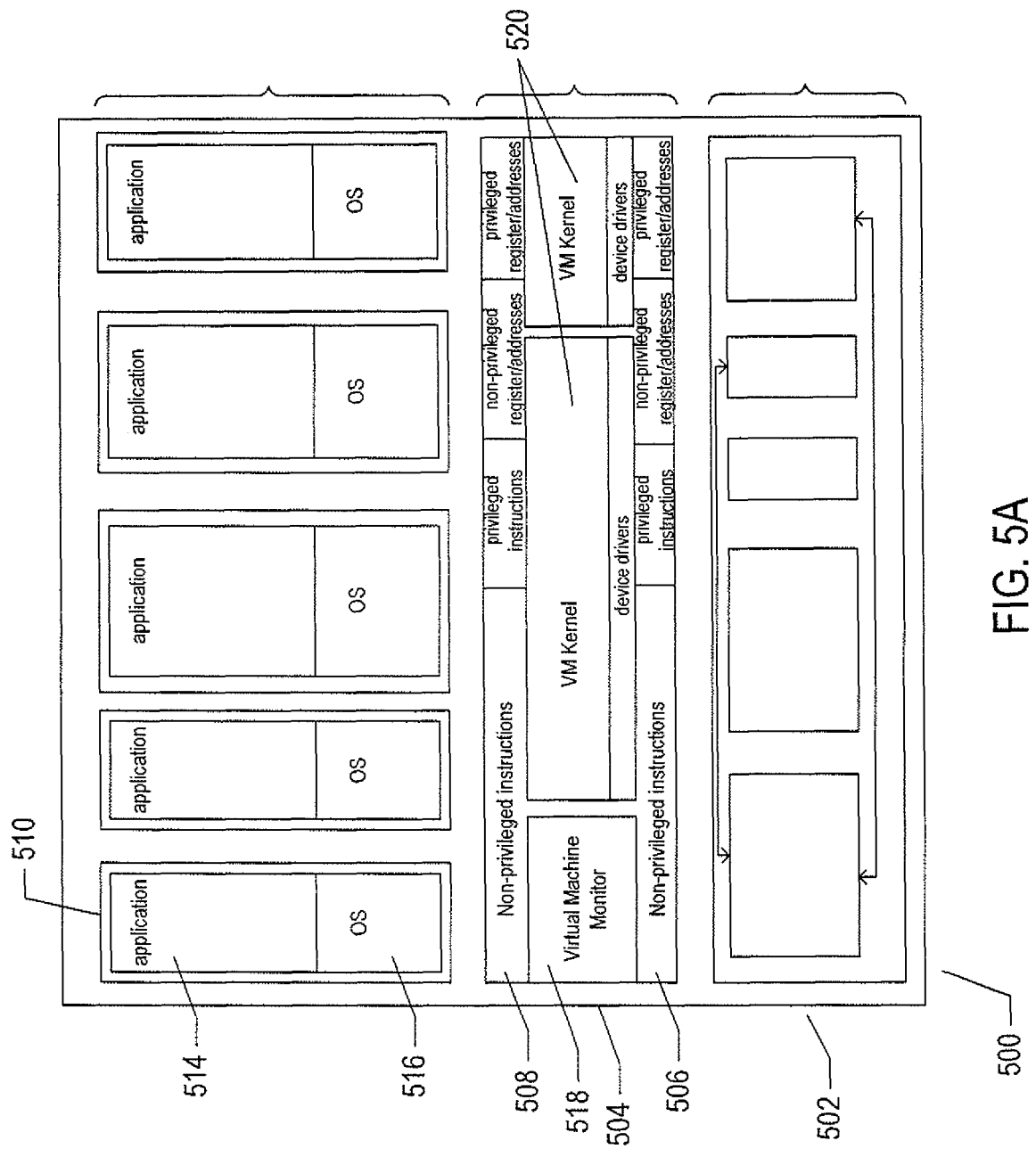
FIGS. 5A-D illustrate two types of virtual machine and virtual-machine execution environments.
Figure 5B:
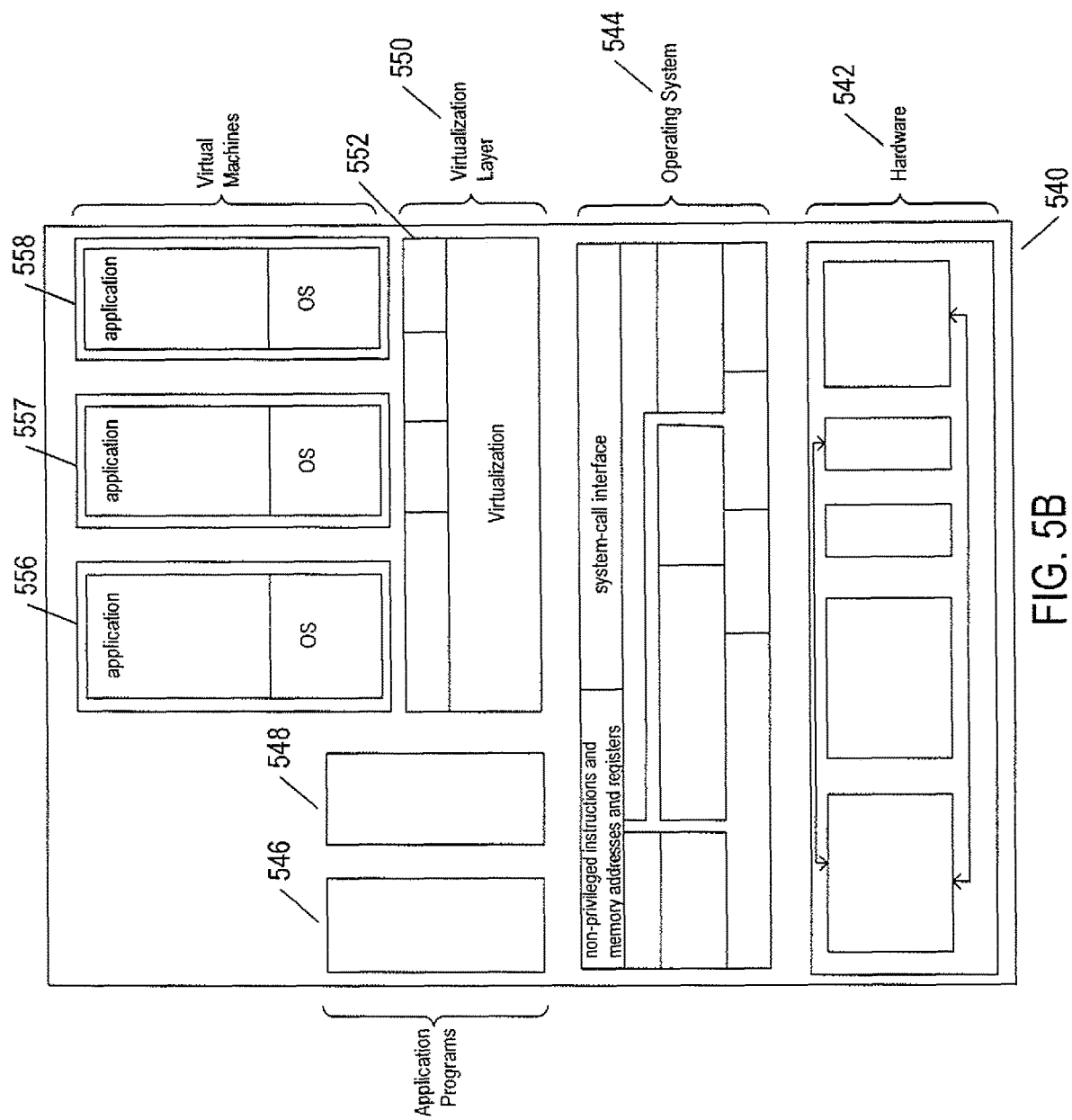

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
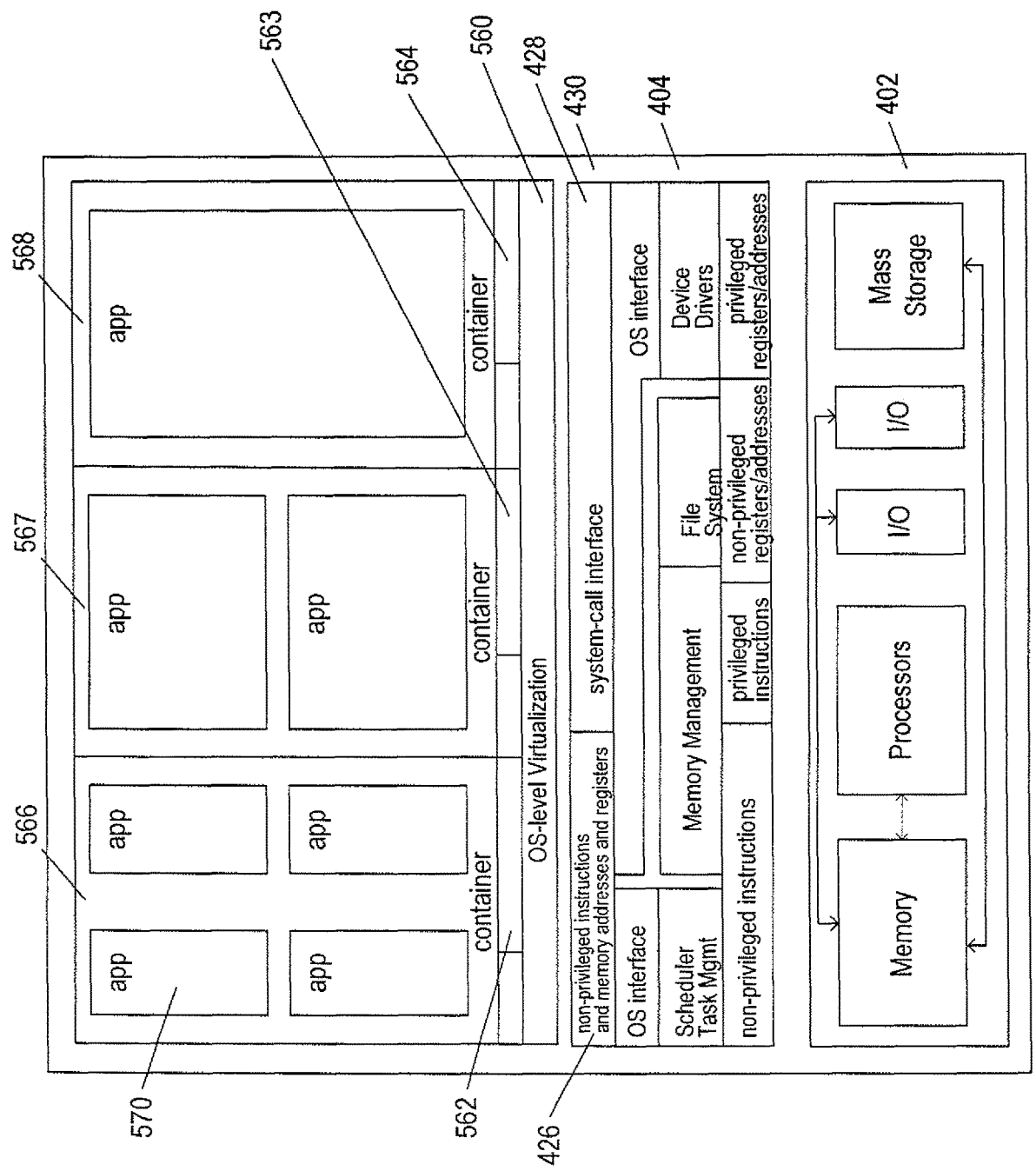

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
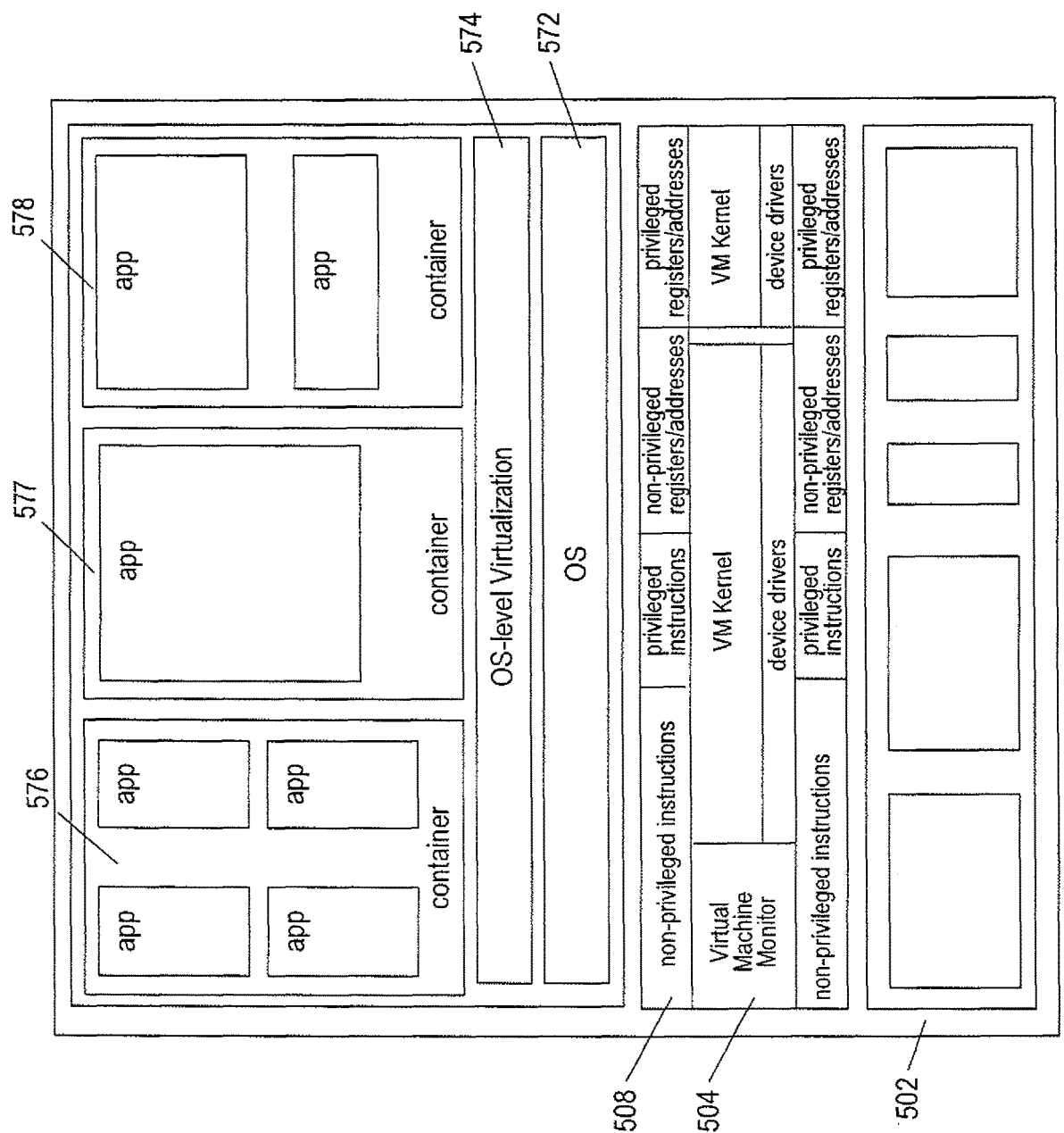

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
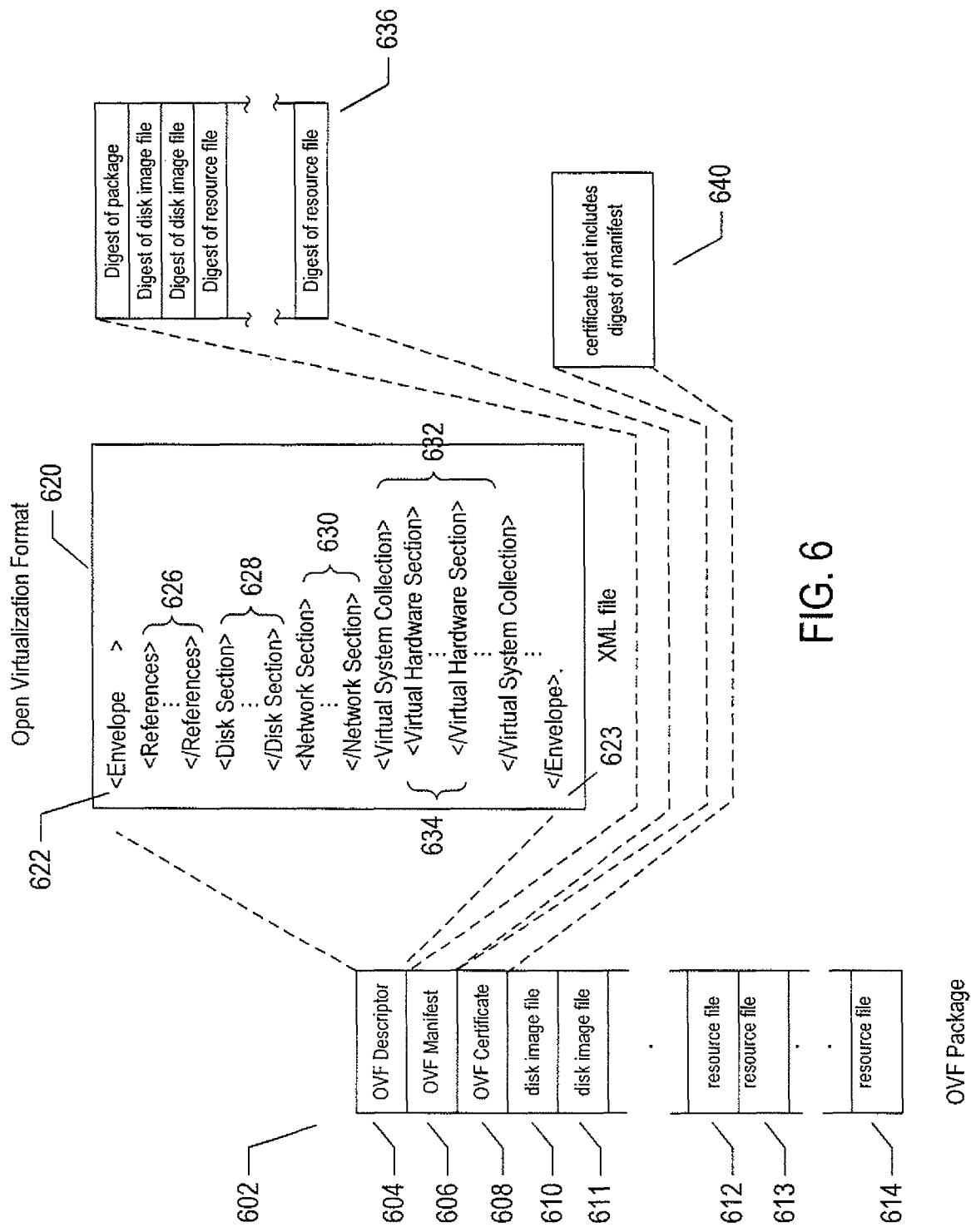
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
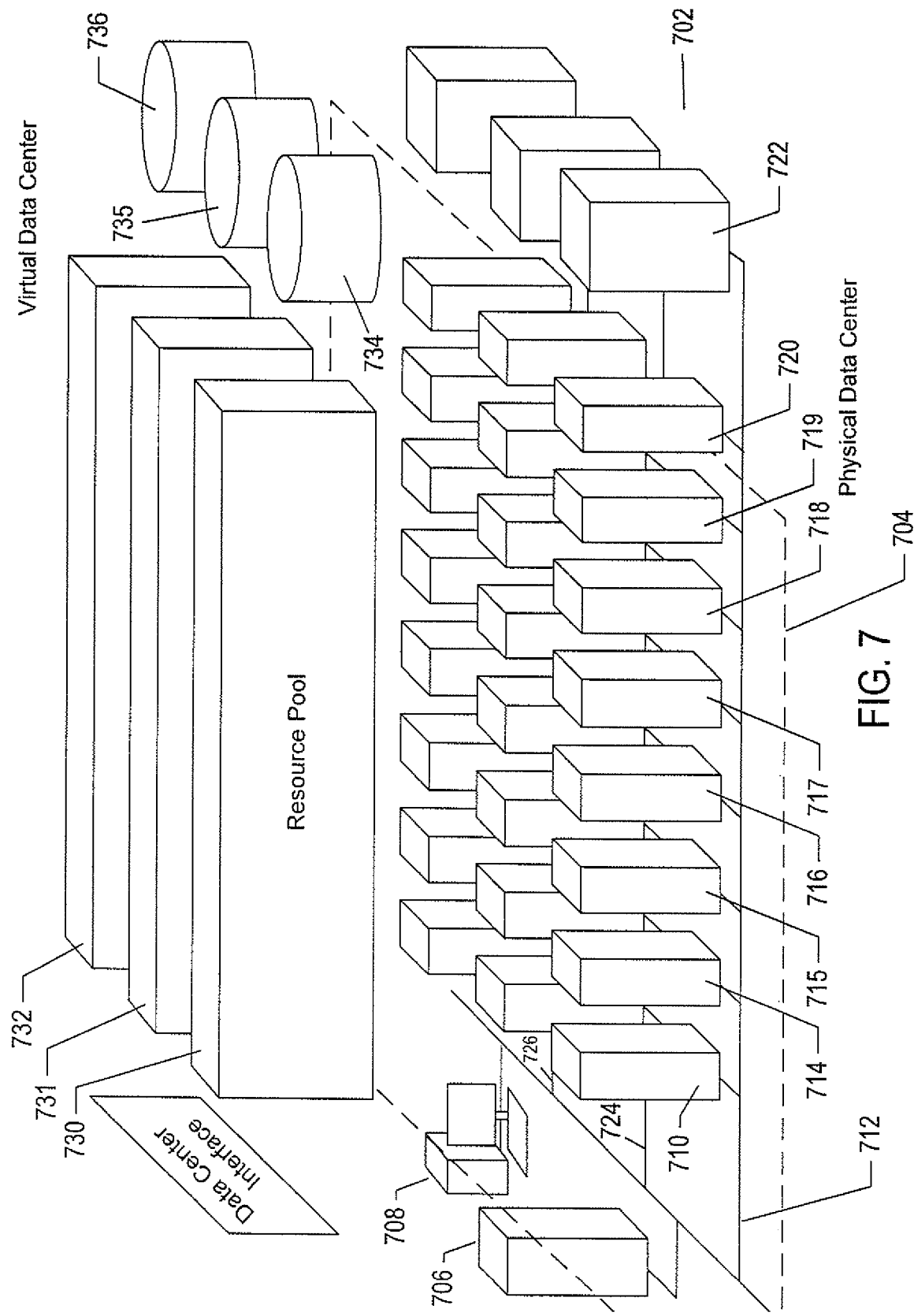
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
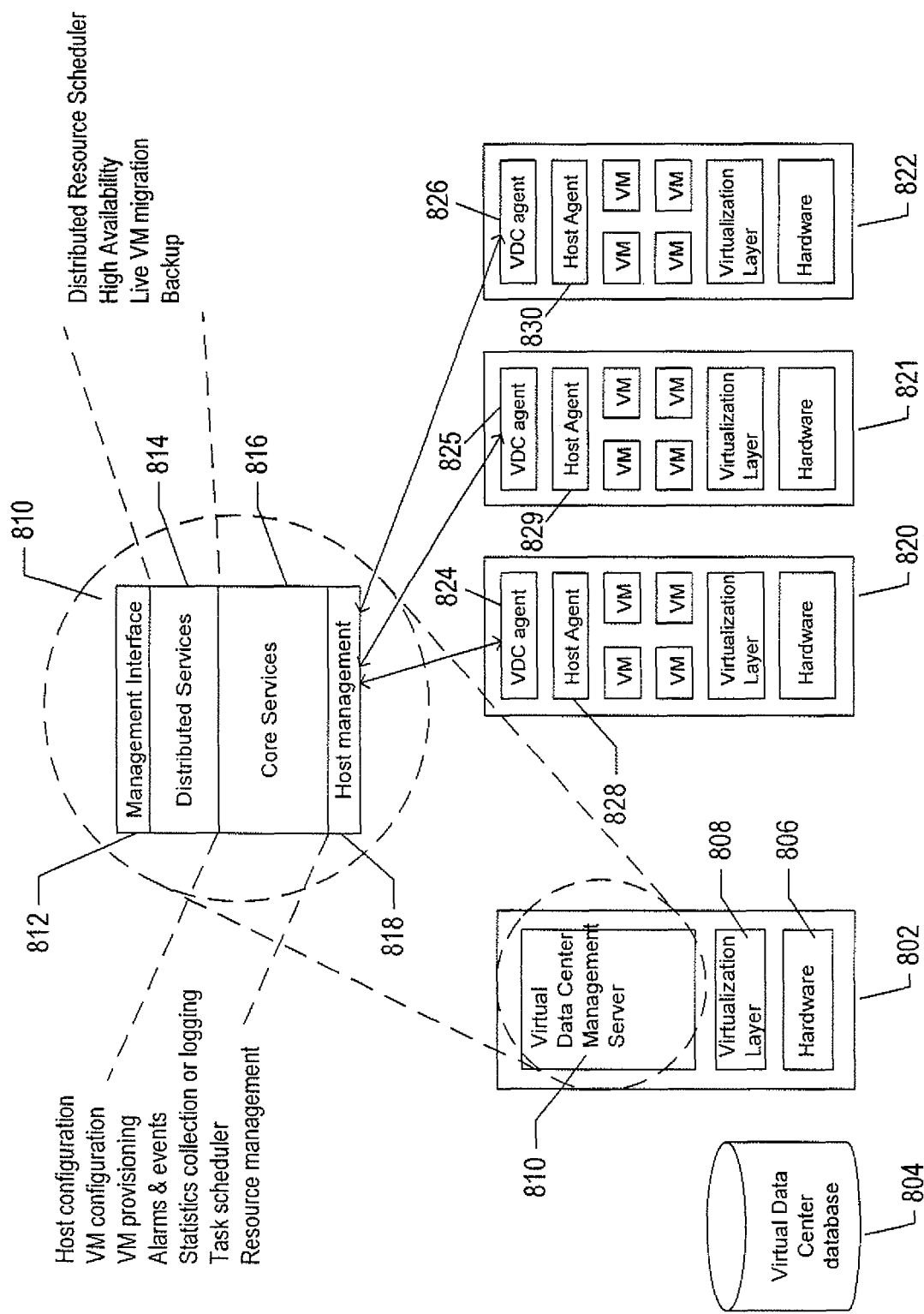
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("APP"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
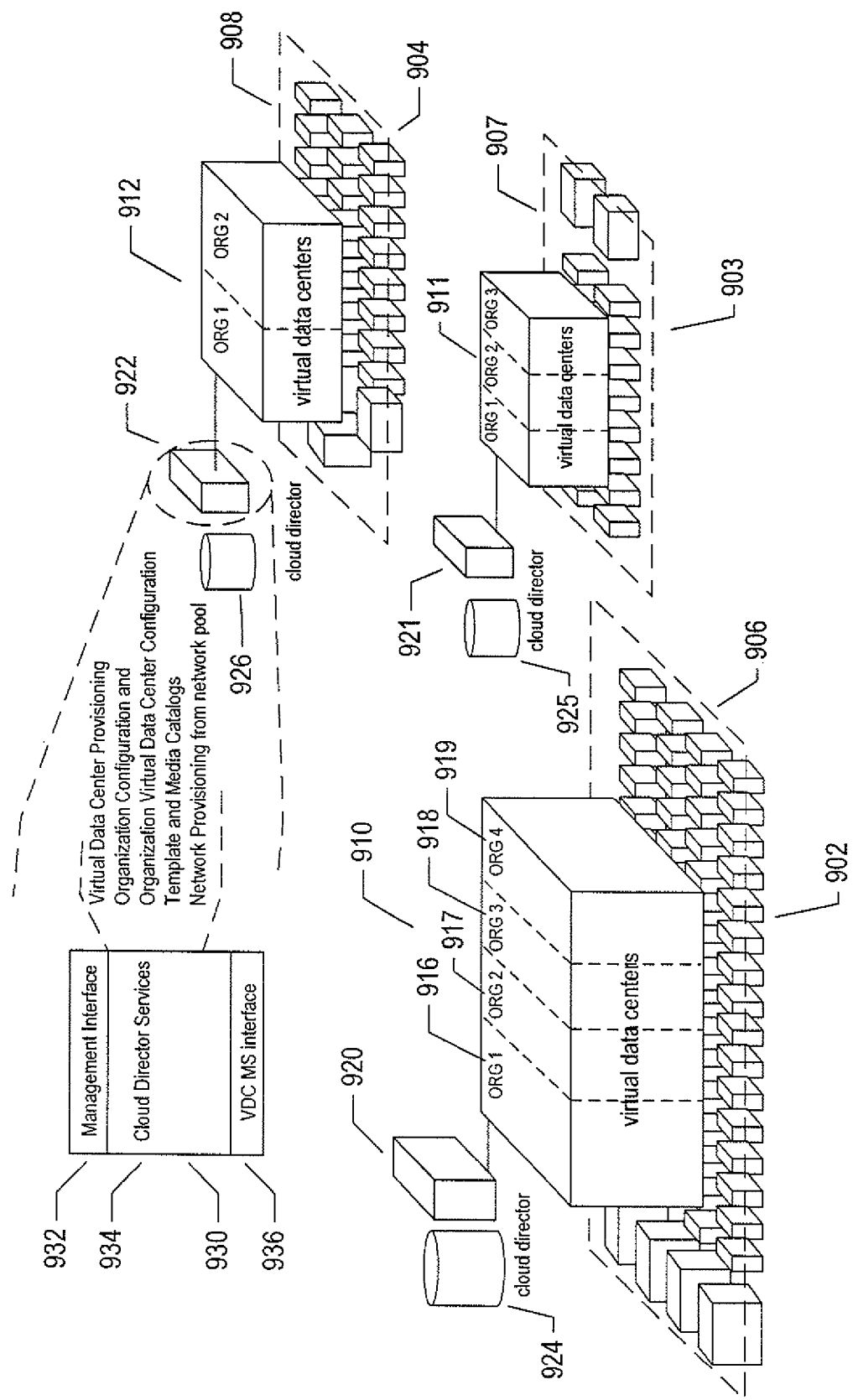
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
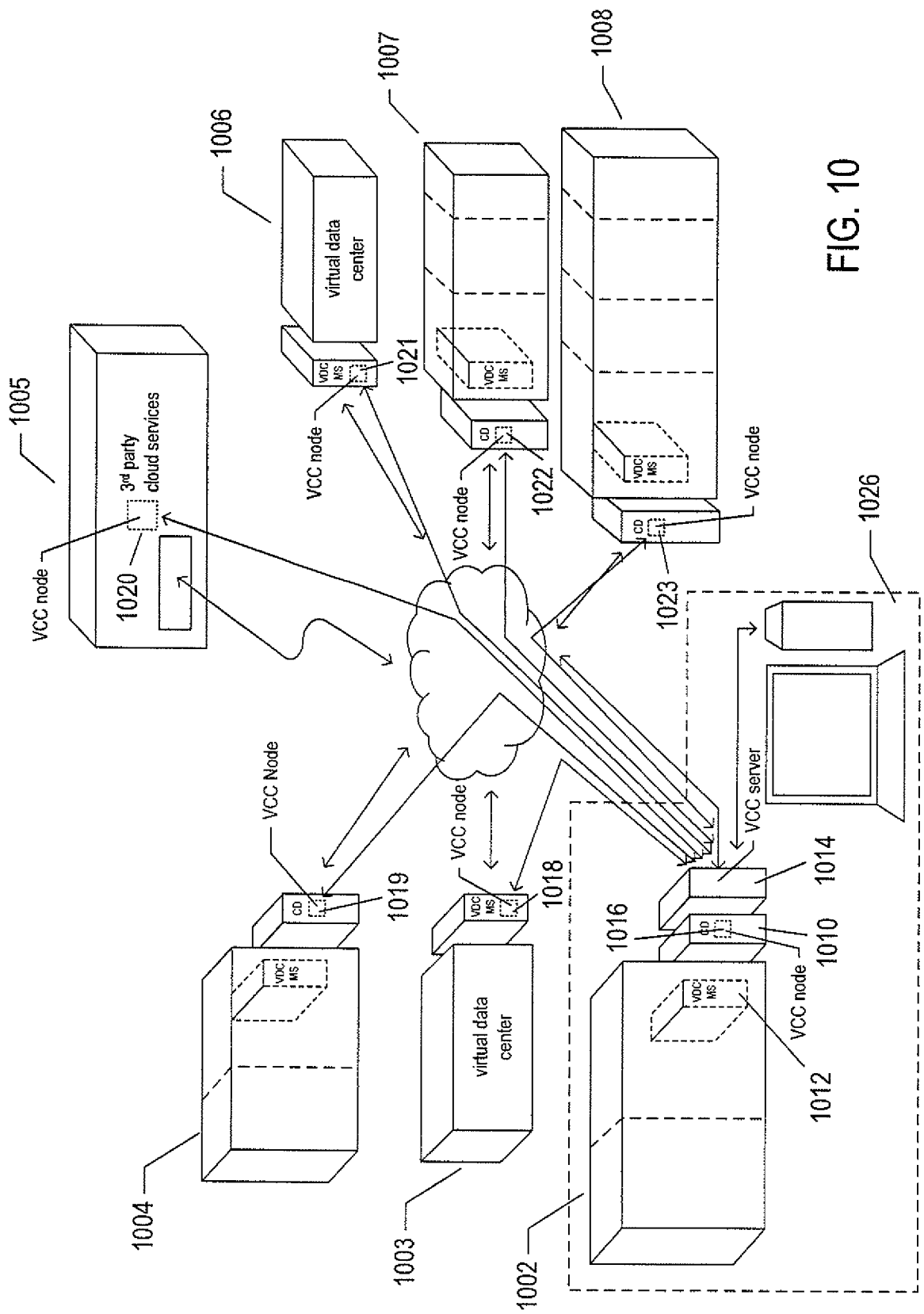
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11:
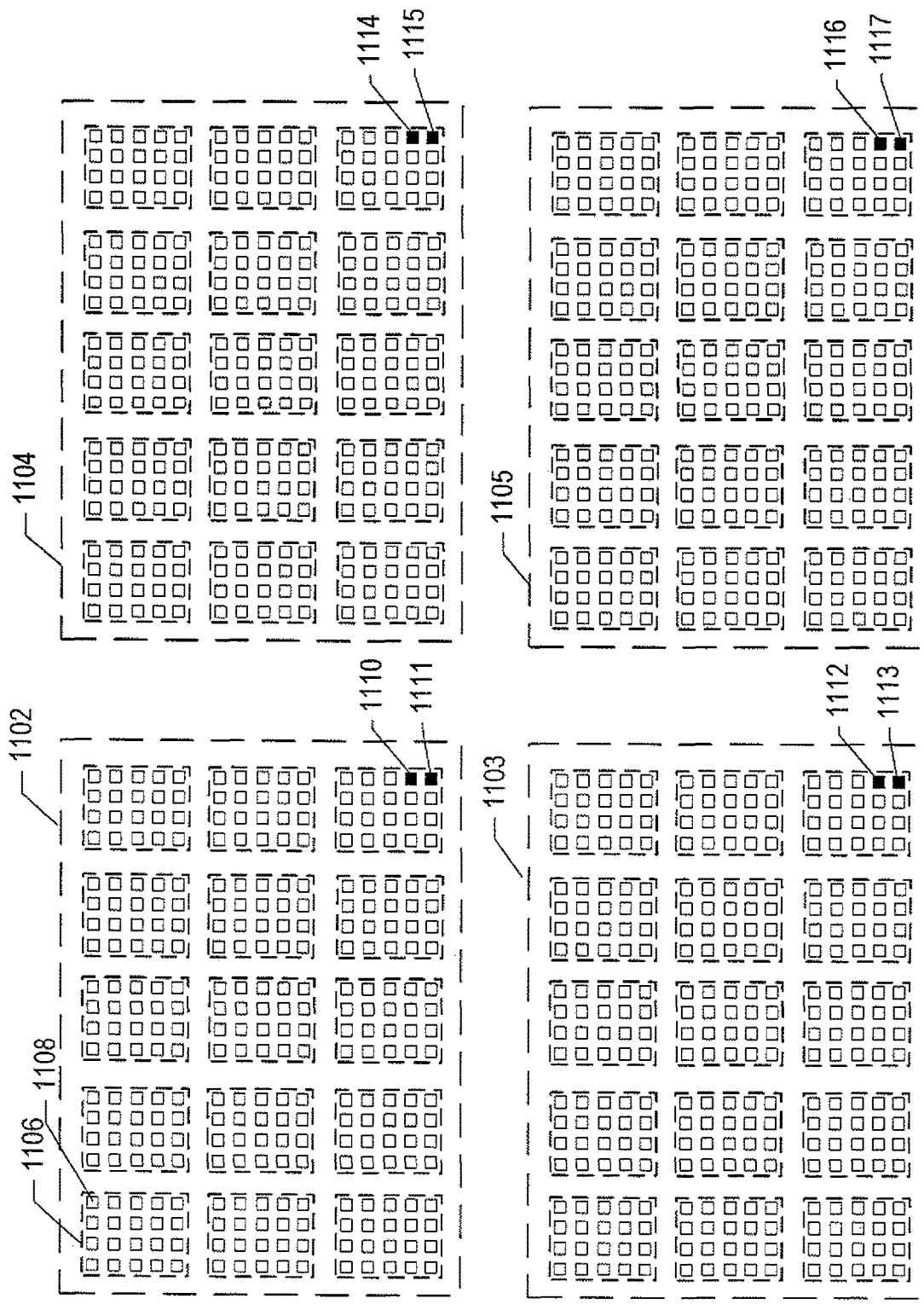
FIG. 11 illustrates a distributed data center or cloud-computing facility that includes a metric-data collection-and-storage subsystem.

FIG. 11 illustrates a distributed data center or cloud-computing facility that includes a metric-data collection-and-storage subsystem. The distributed data center includes four local data centers 1102-1105, each of which includes multiple computer systems, such as computer system 1106 in local data center 1102, with each computer system running multiple virtual machines, such as virtual machine 1108 within computer system 1106 of local data center 1102. Of course, in many cases, the computer systems and data centers are virtualized, as are networking facilities, data-storage facilities, and other physical components of the data center, as discussed above with reference to FIGS. 7-10. In general, local data centers may often contain hundreds or thousands of servers that each run multiple virtual machines. Several virtual machines, such as virtual machines 1110-1111 in a local data center 1102, may provide execution environments that support execution of applications dedicated to collecting and storing metric data regularly generated by other virtual machines and additional virtual and physical components of the data center. Metric-data collection may be, in certain cases, carried out by event-logging subsystems. In other cases, metric-data collection may be carried out by metric-data collection subsystems separate from event-logging subsystems. The other local data centers 1103-1105 may similarly include one or more virtual machines that run metric-data-collection and storage applications 1112-1117.

The metric-data-collection and storage applications may cooperate as a distributed metric-data-collection-and-storage facility within a distributed monitoring, management, and administration component of the distributed computing facility. Other virtual machines within the distributed computing facility may provide execution environments for a variety of different data-analysis, management, and administration applications that use the collected metrics data to monitor, characterize, and diagnose problems within the distributed computing facility. While abstract and limited in scale, FIG. 11 provides an indication of the enormous amount metric data that may be generated and stored within a distributed computing facility, given that each virtual machine and other physical and virtual components of the distributed computing facility may generate hundreds or thousands of different metric data points at relatively short, regular intervals of time.

Figure 12:
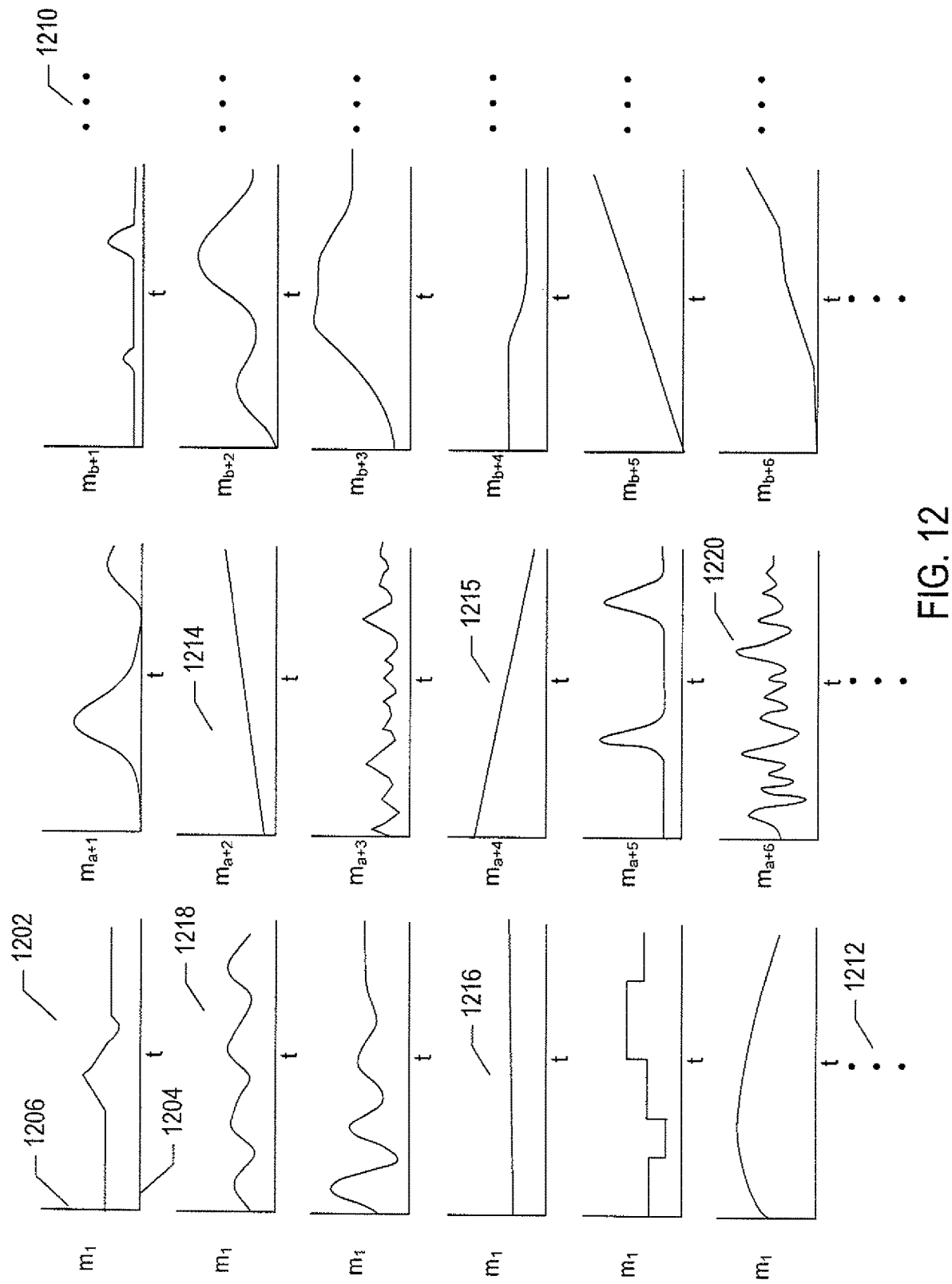
FIG. 12 illustrates the many different types of metric data that may be generated by virtual machines and other physical and virtual components of a data center, distributed computing facility, or cloud-computing facility.

FIG. 12 illustrates the many different types of metric data that may be generated by virtual machines and other physical and virtual components of a data center, distributed computing facility, or cloud-computing facility. In FIG. 12, each metric is represented as 2-dimensional plot, such as plot 1202, with a horizontal axis 1204 representing time, a vertical axis 1206 representing a range of metric values, and a continuous curve representing a sequence of metric-data points, each metric-data point representable as a timestamp/metric-data-value pair, collected at regular intervals. Although the plots show continuous curves, metric data is generally discrete, produced at regular intervals within a computing facility by a virtual or physical computing-facility component. A given type of component may produce different metric data than another type of component. For purposes of the present discussion, it is assumed that the metric data is a sequence of timestamp/floating-point-value pairs. Of course, data values for particular types of metrics may be represented as integers rather than floating-point values or may employ other types of representations. As indicated by the many ellipses in FIG. 12, such as ellipses 1210 and 1212, the set of metric-data types collected within a distributed computing facility may include a very large number of different metric types. The metric-data-type representations shown in FIG. 12 can be considered to be a small, upper, left-hand corner of a large matrix of metric types that may include many hundreds or thousands of different metric types. As shown in FIG. 12, certain metric types have linear or near-linear representations 1214-1216, other metric types may be represented by periodic or oscillating curves 1218, and others may have more complex forms 1220.

Figure 13:
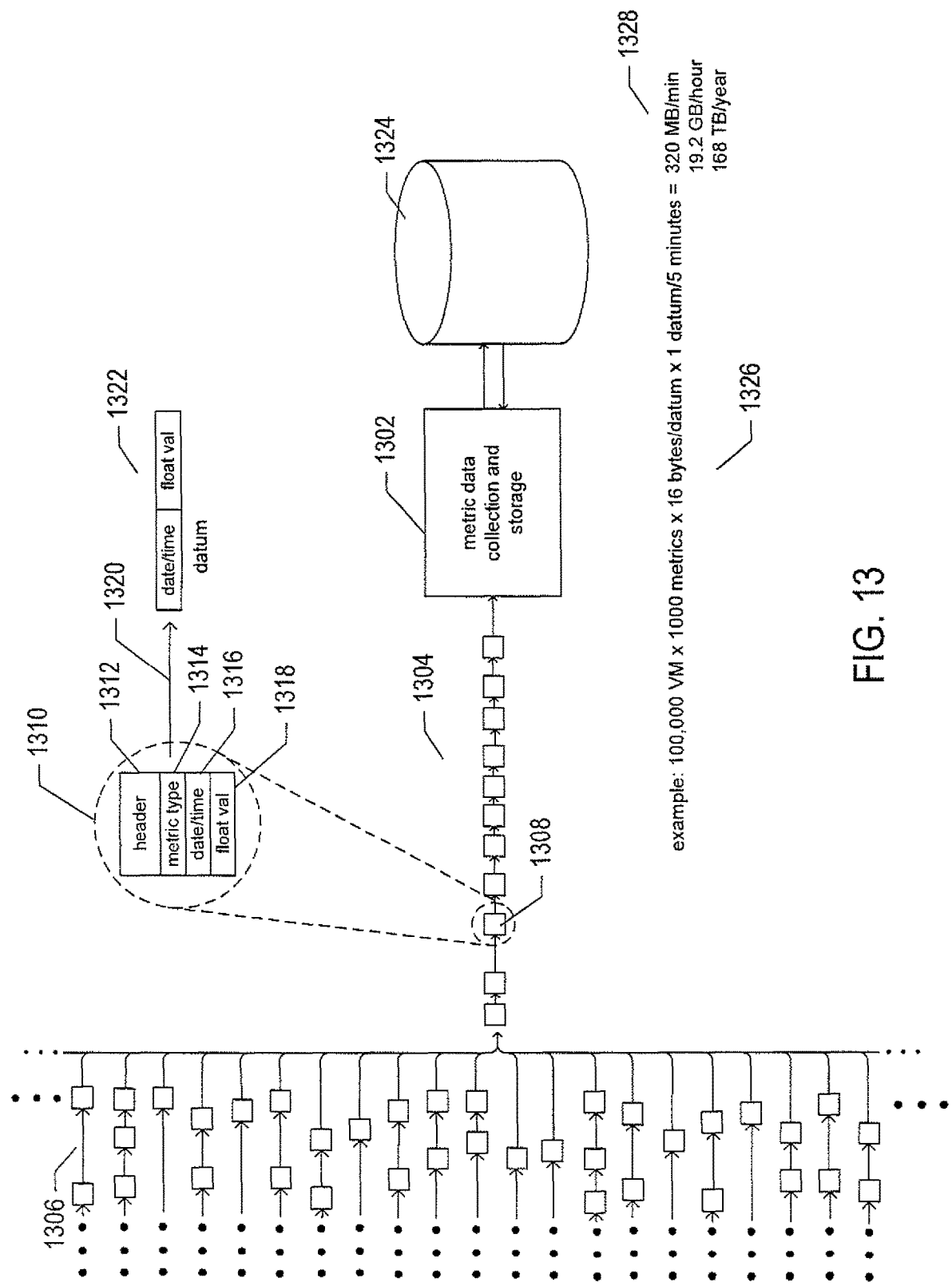
FIG. 13 illustrates metric-data collection within a distributed computing system.

FIG. 13 illustrates metric-data collection within a distributed computing system. As discussed above with reference to FIG. 11, a distributed computing system may include numerous virtual machines that provide execution environments for dedicated applications that collect and store metric data on behalf of various data-analysis, monitoring, management, and administration subsystems. In FIG. 13, rectangle 1302 represents a metric-data-collection application. The metric-data-collection application receives a continuous stream of messages 1304 from a very large number of metric-data sources, each represented by a separate message stream, such as message stream 1306, in the left-hand portion of FIG. 13. Each metric-data message, such as metric-data message 1308 shown in greater detail in inset 1310, generally includes a header 1312, an indication of the metric-data type 1314, a timestamp, or date/time indication 1316, and a floating-point value 1318 representing the value of the metric at the point in time represented by the timestamp 1316. In general, the metric-data collection-and-storage subsystem 1302 processes the received messages, as indicated by arrow 1320, to extract a timestamp/metric-data-value pair 1322 that is stored in a mass-storage device or data-storage appliance 1324 in a container associated with the metric-data type and metric-data source. Alternatively, the timestamp/metric-data-value pair may be stored along with additional information indicating the type of data and data source in a common metric-data container or may be stored more concisely in multiple containers, each associated with a particular data source or a particular type of metric data, such as, for example, storing timestamp/metric-data-value pairs associated with indications of a metric-datatype in a container associated with a particular metric-data source.

As indicated by expression 1326 in FIG. 13, assuming a distributed cloud-computing facility running 100,000 virtual machines, each generating 1000 different types of metric-data values every 5 minutes, and assuming that each timestamp/metric-data-value pair comprises two 64-bit values, or 16 bytes, the distributed cloud-computing facility may generate 320 MB of metric data per minute 1328, equivalent to 19.2 GB of metric data per hour or 168 TB of metric data per year. When additional metric-data-type identifiers and data-source identifiers are stored along with the timestamp/metric-data-value pair, the volume of stored metric data collected per period of time may increase by a factor of 2 or more. Thus, physical storage of metric data collected within a distributed computer system may represent an extremely burdensome data-storage overhead. Of course, that data-storage overhead also translates into a very high computational-bandwidth overhead, since the stored metric data is generally retrieved from the data-storage appliance or appliances and processed by data-analysis, monitoring, management, and administration subsystems. The volume of metric data generated and stored within a distributed computing facility thus represents a significant problem with respect to physical data-storage overheads and computational-bandwidth overheads for distributed computing systems, and this problem tends to increase over time as distributed computing facilities include ever greater numbers of physical and virtual components and as additional types of metric data are collected and processed by increasingly sophisticated monitoring, management, and administration subsystems.

While the volume of collected metric data is a significant problem for metric-data-collection-in-analysis subsystems, an additional, related problem is that metric-data sets may exhibit various characteristics over relatively extended periods of time. In order to identify these characteristics, a relatively large time window of collected metric data needs to be accessible to data-analysis subsystems. As one example, periodic, repeating patterns in a data set may represent significant operational states and/or significant temporal event clusters that provide information to monitoring subsystems that allow them to predict future problems and to forecast future system characteristics, but the repeating patterns may not be discernible unless metric data collected over a relatively long period of time is available for analysis. Because storing the large amounts of uncompressed metric data collected over long periods of time in memory is prohibitively expensive for even large distributed computing systems, particularly when thousands of metric-data sets may be concurrently collected, stored, and analyzed, current systems may often archive the collected metric data in mass-storage devices. As a result, data analysis for detecting long-period repeating patterns often involves retrieving stored metric data from mass-storage devices and accordingly scheduling analysis of the retrieved data, which significantly increases the time lag between the occurrence of a repeating-pattern signal and recognition of, and response to, the signal. The computational overheads associated with processing large volumes of metric data collected over long time periods can be formidable and, when considering the number of metric-data sets that need to be concurrently monitored, can often be prohibitively computationally expensive.

Figure 14:
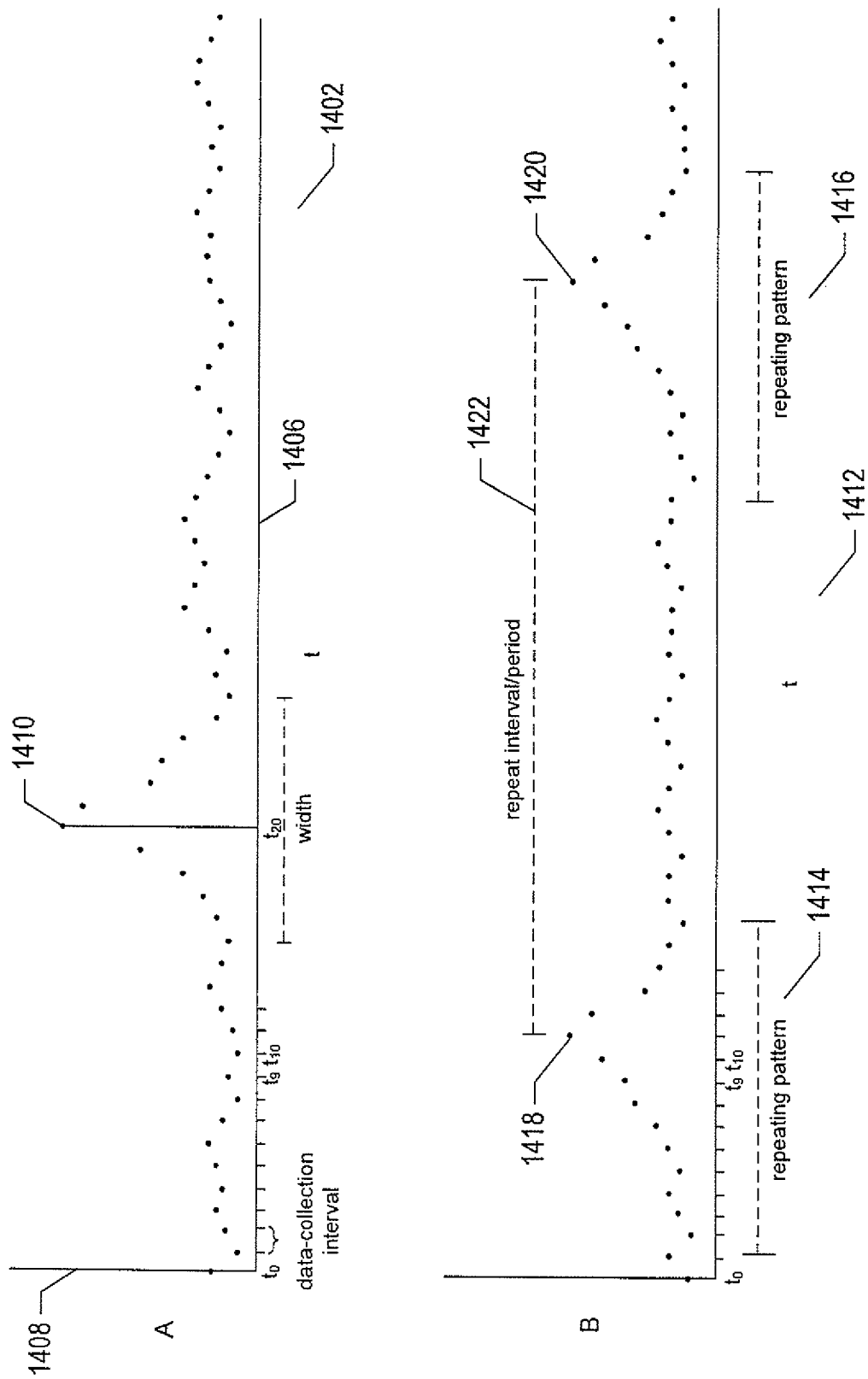
FIG. 14 illustrates two different types of metric-data characteristics.

FIG. 14 illustrates two different types of metric-data characteristics. In a first plot 1402, a portion of the collected metric data of a metric-data set A is represented by filled disks, such as filled disk 1404, plotted with respect to a horizontal time axis 1406 and a vertical metric-data-value axis 1408. A subset of contiguous data points, such as those plotted in plot 1402, represents a time window defined by the portion of the horizontal time axis underlying the data points. There is a relatively large spike, or narrow peak, with a summit occupied by data point 1410. Such peaks may represent significant operational states of a computer system or significant events within a computer system, or may have other types of significance or relevance to various data-analysis, computer-system monitoring, computer-system-characteristics forecasting and prediction, and computers-system-management functionalities and subsystems within a distributed computer system. A second plot 1412 containing a portion of the collected metric data of a second metric-data set B is shown in the lower portion of FIG. 14, using the same illustration conventions as used for the first plot 1402, described above. In this case, a first section of the plotted data in the subdomain represented by dashed line segment 1414 is similar or identical to a second section of the plotted data in the subdomain represented by dashed line segment 1416. The two sections of plotted data represent two instances of a repeating pattern in the metric data. The distance between similar or identical identifiable points in the two instances of the repeating pattern, such as the peak points 1418 and 1420, represents the repeat interval 1422, or periodicity, of the repeating pattern in the metric-data set 1412. In many cases, additional instances of the repeating pattern occur at, or near, the periodicity over an extended period of time. Even when not strictly periodic, or when aperiodic, repeating patterns may nonetheless represent significant events or signals for prediction and forecast of future operational states of a distributed computing system.

There are many different ways that spikes, or peaks, and repeating patterns may be characterized. For example, because metric data is often relatively noisy, a peak or spike may be characterized by a ratio of the highest-value point to the apparent width of the peak or spike as well as, in certain cases, a symmetry or approximate symmetry between the earlier-time and later-time portions of the peak or spike, rather than by a single data point with a greater-than-threshold metric-data value. Similarly, a repeating pattern in a metric-data set may not be exactly repeating, but may contain one or more identifiable features that can be identified in each instance of the repeating pattern or in a majority of the instances of the pattern. When multiple identifiable features are characteristic of a repeating pattern, instances of the repeating pattern may be identified by containing more than a threshold percentage of the multiple identifiable features occurring in an expected sequence within a time window in the metric-data set.

Figure 15:
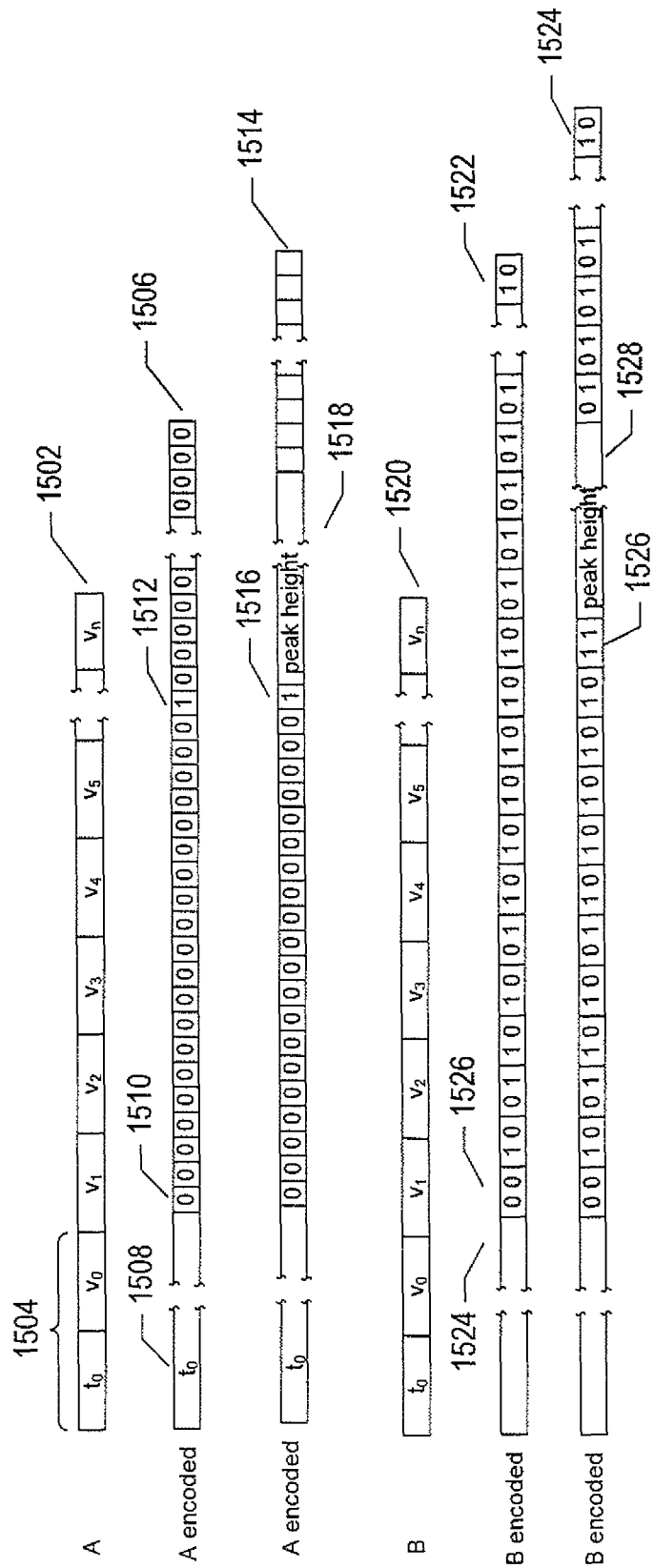
FIG. 15 illustrates several different metric-data-compression methods that may be used to compress timestamp/metric-data-value pairs for efficient storage in memory and mass-storage devices.

FIG. 15 illustrates several different metric-data-compression methods that may be used to compress timestamp/metric-data-value pairs for efficient storage in memory and mass-storage devices. The metric-data set A, a portion of which is plotted in plot 1402 in FIG. 14, is illustrated by the encoded-data-set illustration 1502 of the top of FIG. 15. As discussed above, the metric-data set includes timestamp/metric-data-value pairs, such as timestamp/metric-data-value pair 1504. The timestamps and the metric-data values are generally represented as integers, and often 32-bit, 64-bit, or 128-bit integers. In the case that only the timestamps associated with significant peaks are needed for subsequent data analysis, monitoring, and management tasks a metric-data set a can be compressed to the compressed-data format 1506. In this compressed-data format, a timestamp 1508 for the first timestamp/metric-data-value pair in the data set is included in full, uncompressed form, followed by a single bit, such as bit 1510, for each timestamp/metric-data-value pair in the metric-data set. A single bit can, of course, represent two binary values "0" and "1." A bit in the compressed-data format with value "0" represents a non-peak data point and a bit in the compressed-data format with the value "1" represents a peak data point. In the portion of the metric-data set A shown in plot 1402 of FIG. 14, the data point associated with time $t_{20}$, 1410, is a peak data point, while no other of the plotted data points are peak data points. Therefore, in the encoded format 1506 in FIG. 15, the twentieth single-bit value 1512 is the binary value "1," while the remaining bits, which represent non-peak data points, have the binary value "0." In an alternative encoding, or compressed-data format, 1514, each encoded peak data point, such as peak data point 1516, is followed by a fixed number of bits needed to either precisely indicate or approximately indicate the height of the peak 1518. In this alternative encoding, the significant data points are retained at full resolution or at a level of precision needed by downstream data-analysis and monitoring functionalities.

In the lower portion of FIG. 15, additional data-compression formats suitable for the metric-data set B, plotted in plot 1412 of FIG. 14, are shown using the same illustration conventions as used in the previously discussed upper portion of FIG. 15. The uncompressed encoding for metric-data set B is shown in the encoded-data-set illustration 1520. In the compressed-data format 1522, the timestamp associated with the first data point 1524 is included in uncompressed form, followed by two-bit representations of each data point, including two-bit representation 1526. Two bits encode up to four different values "0," "1," "2," and "3." In the first compressed format 1522, each data point is encoded with one of the three values "0," "1," and "2." The value "0" indicates that the encoded data point is the first data point in the data set or that the preceding data point in the data set has a metric-data value equal to, or approximately equal to, the metric-data value of the encoded data point. The value "1" indicates that the metric-data value of the encoded data point is less than the metric-data value of the previous data point in the data set. The value "2" indicates that the metric-data value of the encoded data point is greater than the metric-data value of the previous data point in the data set. In an alternative compressed-data format 1524, the meanings of the first three two-bit-encoding values "0," "1," and "2," are the same as in the compressed-data format 1522. However, peak data points are encoded with the two-bit-encoding value "3," such as the peak data point 1526. In addition, a number of bits that express the metric-data value of the peak data point 1528 follows the two-data encoding of the peak data point, as in compressed-data format 1514. In yet a different alternative compressed-data format, not shown in FIG. 15, the four different two-bit values "0," "1," "2," and "3" have the same meanings as in the compressed-data format 1524, but the uncompressed peak heights are omitted. This data-compression format is used in a subsequently described implementation.

Figure 16:
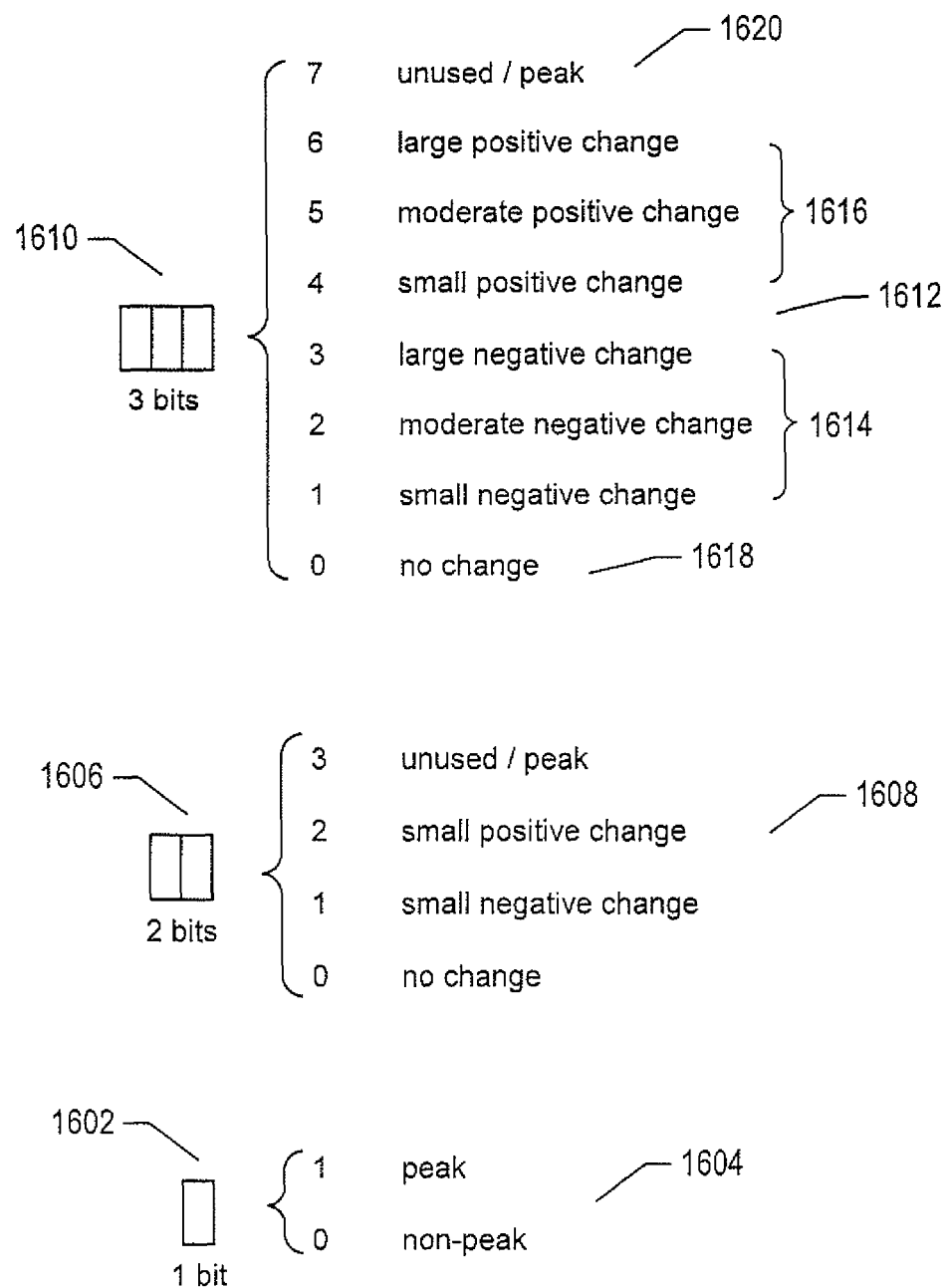
FIG. 16 illustrates various bit-field encodings of timestamp/metric-data-value pairs used according to the currently disclosed methods and systems to compress metric data.

FIG. 16 illustrates various bit-field encodings of timestamp/metric-data-value pairs used according to the currently disclosed methods and systems to compress metric data. These bit-field encodings are representative examples of many different possible bit-field encodings of metric-data data points. As discussed above, with reference to FIG. 15, a single-bit encoding 1602 can be used to differentiate peak data points from non-peak data points 1604. As also discussed above, with reference to FIG. 15, a two-bit encoding 1606 can be used to encode the metric-data-value trends 1608 in a metric-data set. A three-bit encoding 1610 can be used to provide a greater resolution in metric-data-value-trend representation 1612. In this encoding, three different magnitude ranges for metric-data-value decreases 1614 and three different magnitude ranges for metric-data-value increases 616 are encoded along with a no-metric-data-value-change encoding 1618 and a peak-data-point encoding 1620.

Figure 17:
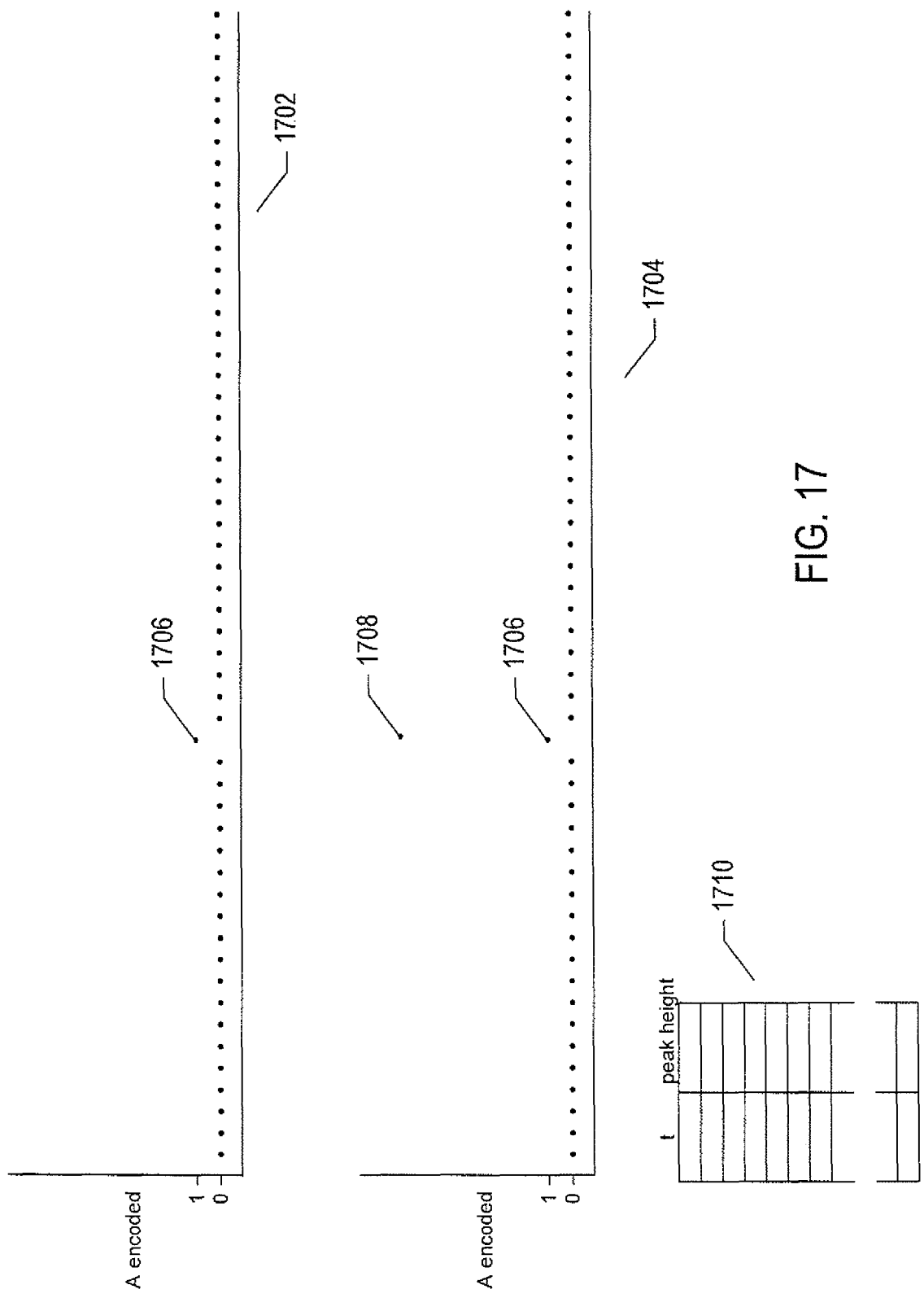
FIG. 17 illustrates the compressed-data values of metric-data set A, a portion of which is plotted in plot 1402 in FIG. 14.

FIG. 17 illustrates the compressed-data values of metric-data set A, a portion of which is plotted in plot 1402 in FIG. 14. Plot 1702 is a plot of the compressed metric data obtained using the first compression method discussed with reference to the first data-compression format 1506 and plot 1704 is a plot of the compressed metric data obtained using the second compression method discussed with reference to the second data-compression format 1514. The single compressed data point 1706 in plot 1702 with the value "1" corresponds to data point 1410 in plot 1402 in FIG. 14. The remaining compressed data points have the value "0." Plot 1704 is similar, but includes, along with the compressed data point 1706, the metric-data-value 1708 of data point 1410 in FIG. 14. Comparing plot 1702 and 1704 in FIG. 17 with plot 1402 in FIG. 14, it can be seen that the compressed data captures only a small portion of the information in the original metric-data set A, but the compression ratio obtained using the compression methods can be nearly 256:1, allowing for storing of a far greater time window of compressed metric data in memory and for efficiently archiving, in mass-storage devices, a very long time window of compressed metric data. When the times associated with peak data points are sufficient for various types of analysis and monitoring tasks, the compressed metric data provides significant advantages in the volumes of stored data and the amount of stored data that can be retained in memory. Table 1710 in FIG. 17 represents yet another approach to compressing the original metric-data set. The peak data points and associated timestamps can be stored as a table of timestamp/metric-data-value pairs.

Figure 18:
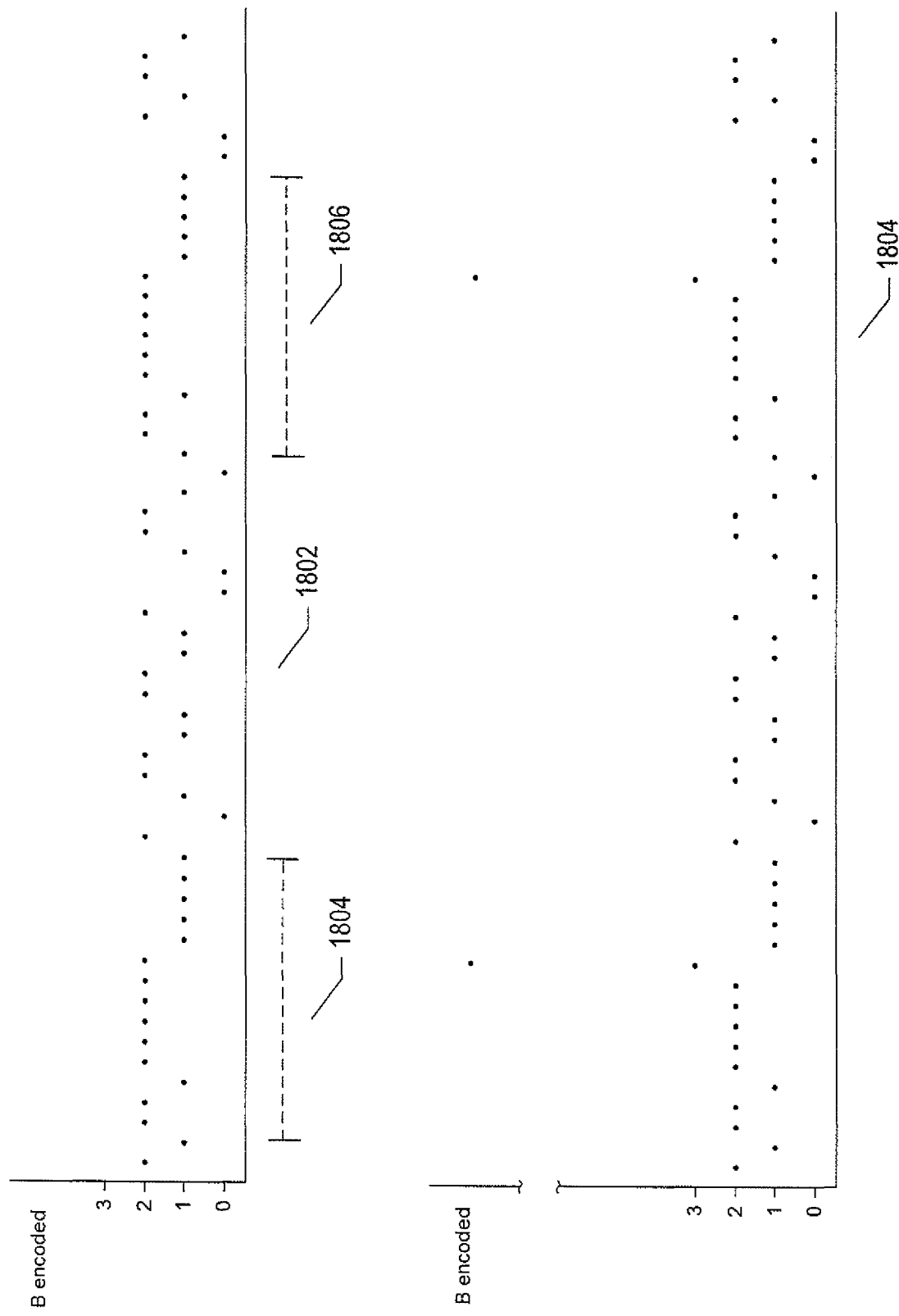
FIG. 18 illustrates the compressed-data values of metric-data set B, a portion of which is plotted in plot 1402 in FIG. 14.

FIG. 18 illustrates the compressed-data values of metric-data set B, a portion of which is plotted in plot 1402 in FIG. 14. Plot 1802 shows the data compressed according to the compression method discussed with reference to the compressed-data format 1522 in FIG. 15. A second plot 1804 shows the data compressed according to the compression method discussed with reference to the compressed-data format 1524 in FIG. 15. These two-bit encodings are perhaps more interesting than the one-bit encoding discussed above with reference to FIG. 17. As can be seen by comparing the plotted data in plots 1802 and 1804 in FIG. 18 with the data plotted in plot 1412 of FIG. 14, the compressed data, when plotted, is similar to the uncompressed-data plot 1412. While, in the compressed data, the data trends are somewhat exaggerated for low-variance portions of the plotted data in plot 1412 and somewhat flattened for the high-variable portions of the plotted data plot 1412, the repeating patterns 1412 and 1416 in the uncompressed-data plot are equally identifiable 1804 and 1806 in the compressed-data plot 1802. Thus, the two-bit encoding of data points according to the data-compression methods discussed above with reference to compressed-data formats 1522 and 1524 allows a much longer time period of metric data to be stored for purposes of identifying periodic patterns in the data set than can be stored in uncompressed form. When the periodicities are relatively long, using the two-bit encoding of data points can facilitate identifying repeating data patterns that would not be identified in the maximum time periods for which uncompressed metric data can be stored.

Figure 19:
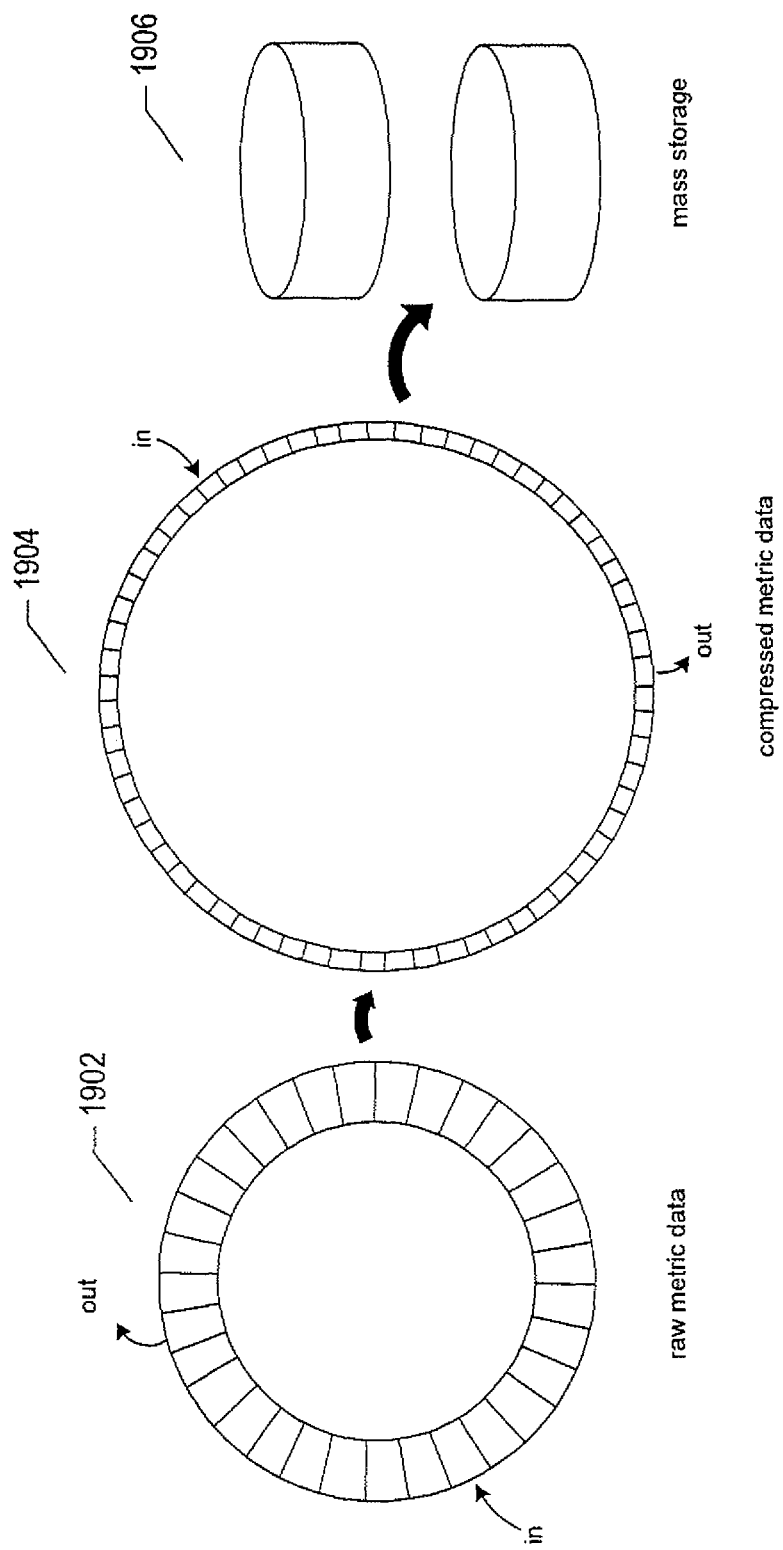
FIG. 19 illustrates the general flow of metric data in certain implementations of the currently disclosed methods and systems.

FIG. 19 illustrates the general flow of metric data in certain implementations of the currently disclosed methods and systems. FIG. 19 illustrates the flow of metric data for a single metric. In more complex, multi-metric implementations, metric data belonging to multiple metric-data sets may be stored together in the various circular queues, discussed below, or, alternatively, the queue-based machinery may be replicated for each metric. Initially, timestamp/metric-data-value data points are received from low-level metric-data collection subsystems and queued to a raw-metric-data input queue 1902. As space is needed in the raw-metric-data input queue for storing newly received data points, the data points are compressed and input to a larger compressed-metric-data queue 1904. As space is needed in the compressed-metric-data queue to store additional data removed from the raw-metric-data queue 1902, compressed data is removed from the compressed-metric-data queue and stored in one or more mass-storage devices 1906. This queue-based method partitions the metric data, at a given point in time, into three portions: (1) the most recently received metric data stored in uncompressed form; (2) the most recently compressed metric data; and (3) the remaining, earlier received, processed, and compressed metric data archived in mass storage.

Figure 20:
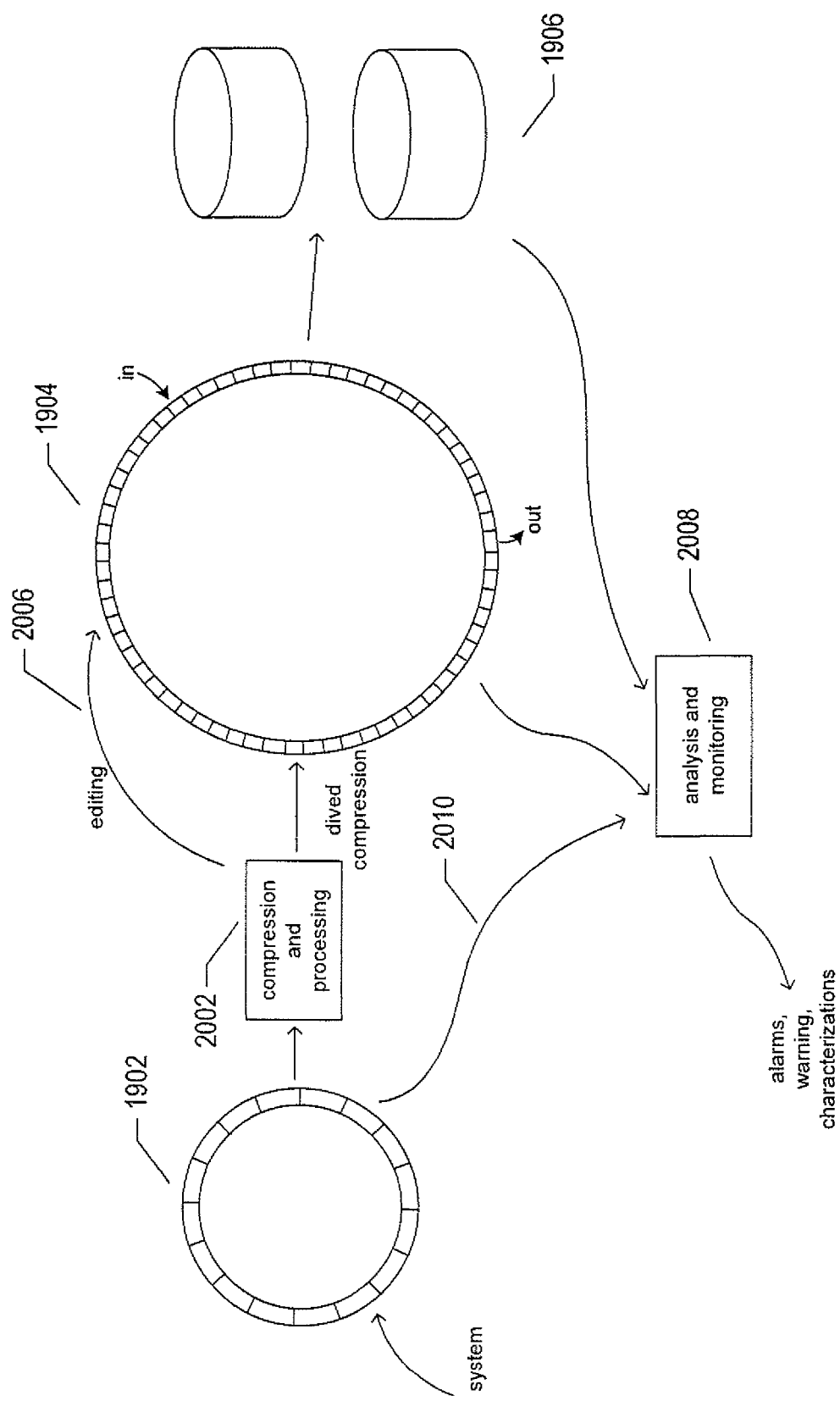
FIG. 20 provides additional details about the data flow, illustrated in FIG. 19, along with indications of how the data is processed as it flows from the raw-metric-data queue to the mass-storage devices.

FIG. 20 provides additional details about the data flow, illustrated in FIG. 19, along with indications of how the data is processed as it flows from the raw-metric-data queue to the mass-storage devices. As shown in FIG. 20, a compression-and-processing subsystem 2002 receives uncompressed metric data points dequeued from the raw-metric-data queue 1902, compresses the data points, and enters the data points into the compressed-metric-data queue 1904. Because the compressed-metric-data queue can store a large quantity of compressed data points for a recent time window, the compression-and-processing subsystem 2002, in addition to directly compressing data points and storing them on the compressed-metric-data queue 1904, as indicated by arrow 2004, edits the entries in the compressed-metric-data queue 1904, as indicated by arrow 2006. For example, consider the compression method discussed above with reference to compressed-data format 1524 in FIG. 15, which encodes peak data points with the encoding value "3." However, a peak data point can be recognized only in the context of a time window of collected data points that precede and follow the peak data point in time. For example, a peak data point may be recognized when it is preceded by some threshold number of lower-value data points with increasing values and when it is followed by a threshold number of lower-value data points with decreasing values.

The compression-and-processing subsystem 2002 can therefore, in addition to directly compressing data points for storage in the compressed-metric-data queue 1904, continuously evaluate a set of most recently queued compressed data points in the compressed-metric-data queue 1904 to identify peak data points and can then edit the stored compressed data corresponding to the peak data points to change their encoded values from "2" to "3."

FIG. 20 additionally shows an analysis-and-monitoring subsystem 2008 that analyzes metric data and uses the results of that analysis to monitor the computer system for various problematic system states, for the occurrence of undesirable events, and for other system characteristics in order to generate alerts, warnings, reports, and other information used by automated system management subsystems as well as by human system administrators. The analysis-and-monitoring subsystem can carry out very precise analysis of uncompressed data over a relatively short time window by accessing the uncompressed metric data stored in the raw-metric-data queue 1902, as indicated by arrow 2010. The analysis-and-monitoring subsystem can access compressed metric data in the compressed-metric-data queue 1904 representing a much longer time window for identifying repeating data patterns and periodicities in the metric-data set as well as for identifying other characteristics and patterns that can only be recognized over larger time windows than possible for memory-resident-data time windows for uncompressed metric data. The compressed metric data residing in the compressed-metric-data queue 1904 remains in memory, and is therefore readily accessible to the analysis-and-monitoring subsystem. Finally, the analysis-and-monitoring subsystem 2008 can access very long time windows of archived metric data stored in the mass-storage devices 1906. When compressed data is archived in the mass-storage devices, the analysis-and-monitoring subsystem 2008 can access data from tens to hundreds of times further back in time than would be possible for metric data stored in uncompressed form.

Figure 21A:
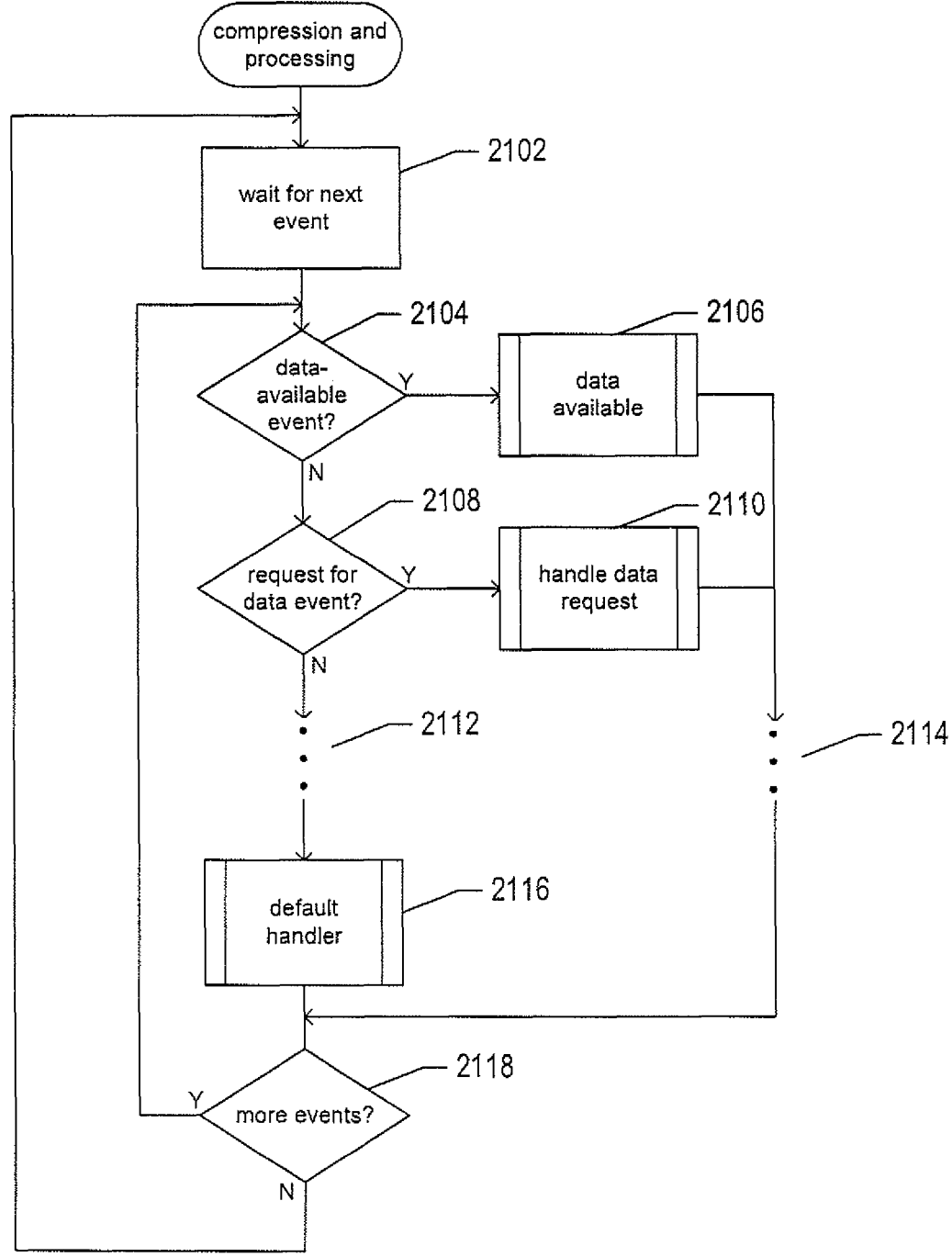
FIGS. 21A-C provides a control-flow diagrams that illustrates an implementation of the compression-and-processing subsystem 2002 discussed above with reference to FIG. 20.
Figure 21B:
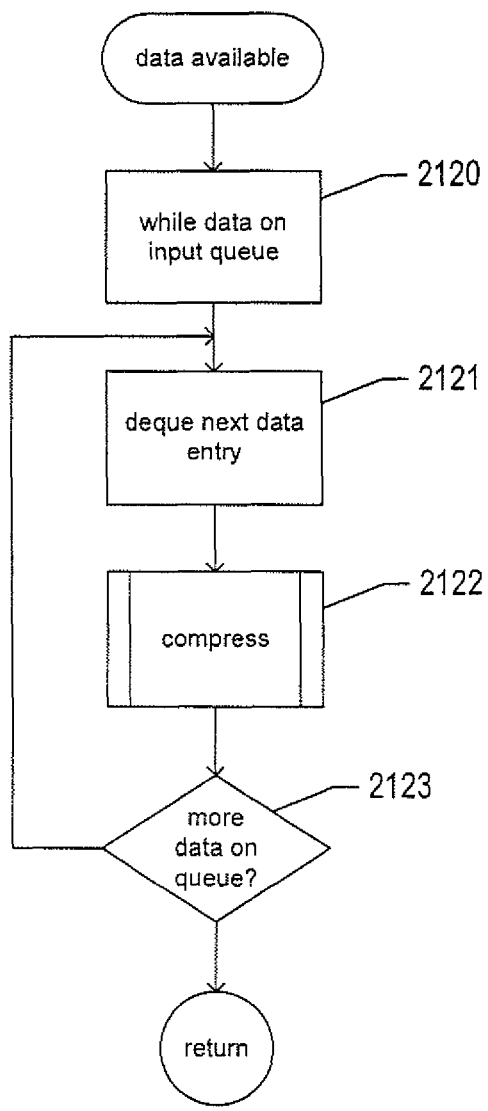
Figure 21C:
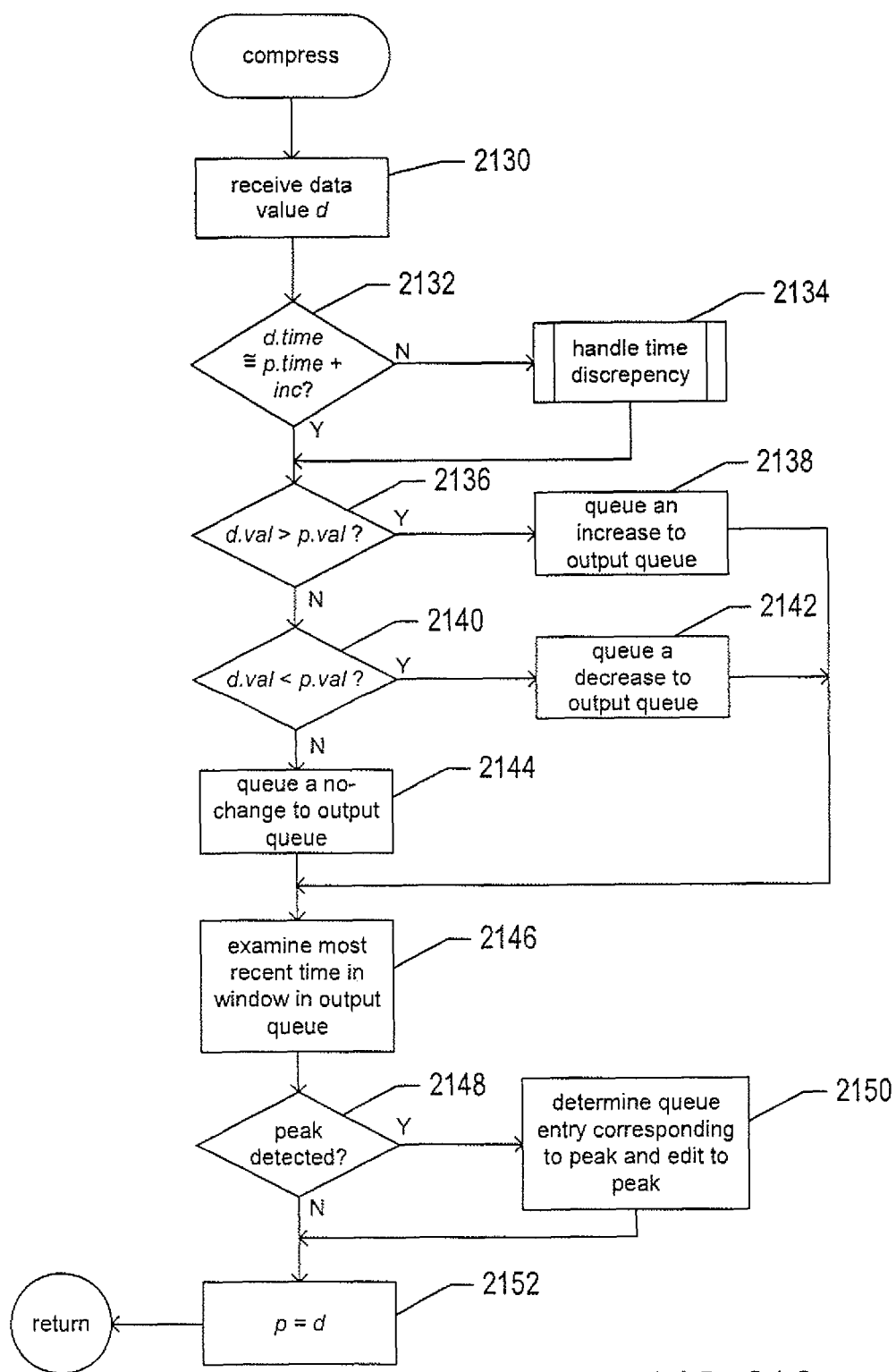

FIGS. 21A-C provides a control-flow diagrams that illustrates an implementation of the compression-and-processing subsystem 2002 discussed above with reference to FIG. 20. This implementation compresses metric data according to the final data-compression method discussed above in the discussion of FIG. 15. FIG. 21A shows an event loop that underlies the compression-and-processing-subsystem implementation. In step 2102, the compression-and-processing subsystem waits for a next event to occur. When the next-occurring event is a data-available event, as determined in step 2104, the handler "data available" is called, in step 2106. A data-available event indicates that uncompressed metric data needs to be removed from the raw-metric-data queue (1902 in FIG. 20) and stored, in compressed form, in the compressed-metric-data queue (1904 in FIG. 20). When the next occurring event is a request-for-data event, as determined in step 2108, the handler "handle data request" is called, in step 2110. A request for data can be made by the analysis-and-monitoring subsystem 2008 shown in FIG. 20. Ellipses 2112 and 2114 indicate that other types of events may be handled by the event loop of the compression-and-processing subsystem. A final default handler 2116 handles unexpected or rare events. When there are more events queued for handling, as determined in step 2118, control returns to step 2104 to evaluate a next event. Otherwise, control returns to step 2102, where the compression-and-processing-subsystem event handler waits for a next event to occur.

FIG. 21B provides a control-flow diagram for the "data available" handler called in step 2106 of FIG. 21A. In the while-loop of steps 2120-2123, the handler "data available" iteratively dequeues a next data point from the raw-metric-data queue and calls a routine "compressed," in step 2122, to compress the data point and store the compressed data point in the compressed-metric-data queue.

FIG. 21C provides a control-flow diagram for the routine "compress," called in step 2122 of FIG. 21B. In step 2130, the routine "compress" receives a next data point d. When the timestamp associated with the received data point d is not approximately equal to the timestamp associated with a previous data point p plus a metric-data time interval, or increment, as determined in step 2132, a routine "handle time discrepancy" is called, in step 2134, to handle the discrepancy between the predicted time for the received data point d and the actual time associated with that data point. In certain implementations, one or more extra null data points may be generated and stored along with the compressed data point to fill a gap in the metric-data set. In other implementations, the values of one or more missing data points may be estimated and compressed data points generated from those estimates for storage in the compressed-metric-data queue. In step 2136, the routine "compress" determines whether the metric-data value associated with the received data points is greater than the metric-data value of the previous data point. If so, then the routine "compress" queues the compressed-data value "2" to the compressed-data queue to represent the data point d, in step 2138. In step 2140, the routine "compress" determines whether or not the metric-data value in the received data point d is less than the metric-data value in the previous data points p. If so, then the routine "compress" queues a compressed-data value "1" to the compressed-data queue in step 2142. Otherwise, in step 2144, the routine "compress" queues a no-change compressed-data value "0" to the compressed-metric-data queue. In step 2146, the routine "compress" examines a most recent time window in the compressed-metric-data queue to determine whether or not a peak data point has occurred. If so, as determined in step 2148, the routine "compress" edits the compressed-metric-data-queue entry corresponding to the peak data point to change the compressed-a data value from "2" to "3." In step 2150. In step 2152, the value of the previous data points p is set to the value of the received data point d in preparation for handling a subsequent data point.

FIGS. 22A-F show a C++ implementation of the compressed-metric-data queue (1904 in FIG. 20). In this implementation, compressed data-point values are added to the compressed-metric-data queue one-at-a-time. When the compressed-metric-data queue is full, a specified number of already queued compressed-data values are transferred to mass storage prior to addition of a next new compressed data value.

FIG. 22A shows the declarations of a header file that includes a declaration of the class C_Queue, which implements the compressed-metric-data queue. A number of type definitions and an alias are first declared in the initial lines of the header file 2202. The type UNIT 2203 is the unit of data storage in the data-storage buffer of the compressed-metric-data queue. The type TIME 2204 is the data type for a timestamp. The type UNIT_PTR 2205 is a pointer to an instance of the UNIT type. The function name transferFunction 2206 is a function passed to an instance of the class C_Queue that allows the instance of the class C_Queue to transfer compressed metric data to mass-storage devices. This function is called with arguments that specify the starting point of the compressed metric data 2208, the number of UNIT instances to transfer 2209, and the number of compressed-data values included in the compressed metric data to be transferred 2210. The constant BYTES_PER_UNIT 2211 is the number of bytes in each UNIT and the constant BITS_PER_UNIT 2212 is the number of bits in each UNIT. The type INTERNAL_UNIT_PTR 2213 is a pointer to an entry in the compressed-data queue, and includes a unitOffset 2214, the index of a UNIT within the compressed-data-queue buffer, and a bitOffset 2215 for the compressed-metric-data value within the UNIT indexed by the unitOffset 2214.

The class declaration for the class C_Queue 2216 includes a number of private data members 2217, a number of private member functions 2218, and a number of public member functions 2220. The private data members include: (1) eSize 2221, the number of bits per compressed-metric-data value, or bits per queue entry; (2) numberEntriesPerUnit 2222, the number of entries in each data-storage UNIT; (3) buffer 2223, an array of data-storage UNITs; (4) bufferSize 2224, the number of data-storage UNITs in the array buffer; (5) in 2225, a pointer to the next free queue entry in which to place a next compressed-data value; (6) out, a pointer to the first queue entry containing a compressed-data value to next transfer to mass-storage devices 2226; (7) initial 2227, the timestamp for the entry pointed to by out; (8) final 2228, the timestamp of the for the entry pointed to by in; (9) totalEntries 2229, the total number of entries that can be stored in the compressed-metric-data queue; (10) numEntries 2230, the number of entries currently stored in the compressed-metric-data queue; (11) tFunction 2231, a pointer to a function that is called the transfer data to the mass-storage devices; (12) tSize 2232, the size, in UNITs, to transfer to the mass-storage devices when more room is needed for a newly arrived compressed-data value in the compressed-metric-data queue; (13) tSizeEntries 2233, the size, in entries, to transfer to the mass-storage devices; and (14) inc 2234, the time increment between successive metric data points.

The private member functions 2218 of the class C_Queue include: advanceIn 2235, which advances the pointer in by one queue entry; (2) advanceOut 2236, which advances the pointer out by a number of entries specified by the argument num; (3) enter 2237, which enters a compressed-data value into the compressed-metric-data queue at a particular specified UNIT offset and at a particular specified bit offset; (4) transfer 2238, which is called to transfer compressed-data values from the compressed-metric-data queue to the mass-storage devices; and (5) flush 2239, which flushes any remaining queue entries to the mass-storage devices prior to destruction of an instance of the class C_Queue. The public member functions 2220 of the class C_Queue include: (1) addEntry 2240, which queues a compressed-data value to the compressed-metric-data queue; (2) editEntry 2241, which is called to edit a compressed-data value currently stored within the compressed-metric-data queue; (3) getNumEntries 2242, which returns the number of entries currently stored in the compressed-metric-data queue; (4) getStart 2243, which returns the most recent timestamp for an entry in the compressed-metric-data queue; (5) getEntries 2244, which extracts and returns a number of entries in the compressed-metric-data queue specified by the argument num starting with an entry specified by the argument first, with the extracted data placed into a buffer specified by the argument buf; and (6) a constructor/destructor pair 2245 and 2246. The constructor 2245 is called with arguments that specify: (1) the size, in UNITs, of the compressed-metric-data queue; (2) the number of bits in each compressed-data value; (3) the number of UNITs to transfer to the mass-storage devices each time the compressed-metric-data queue is full; (4) a pointer to the function to call to carry out a transfer data to the mass-storage devices; (5) a start time for the compressed data points; and (6) the time increment, or time interval between metric data points.

FIG. 22B provides implementations of the constructor/destructor member functions for the class C_queue and for the private member functions advanceIn and advanceOut. The constructor 2247 initializes the private data members of an instance of the class C_queue. The values are obtained either from supplied arguments the operator new, or, in general, are the numeric value 0. The destructor 2248 flushes the compressed-metric-data queue and deletes the array of UNITs allocated by the constructor for the private data member buffer. The private member function advanceIn 2249 increments the member bitOffset of the pointer in by the number of bits for a compressed-data value and, when the member bitOffset is equal to the number of bits in a UNIT, increments the member unitOffset of the pointer in. When the member unitOffset is equal to the buffer size, the member unitOffset is to 0 in order to wrap from the end of the buffer back to the beginning of the buffer, implementing a circular queue. The member function advanceOut 2250 similarly advances the pointer out. This function does not need to increment the bit offset, since data transfer from the compressed-metric-data queue to the mass-storage devices occurs on UNIT boundaries.

FIG. 22C shows implementations of the member functions enter and addentry. The member function entry 2251 creates a bit mask mask 2252 that is used to extract a number of bits from a supplied compressed-data value equal to the number of bits stored for each compressed-data value and place the extracted bits into a UNIT instance u 2253. The compressed-data bits are then shifted by an offset 2254, as is mask 2255, and the compressed-data bits are then entered into a compressed-metric-data-queue entry 2256. The member function addEntry 2252 first determines whether or not the compressed-metric-data queue is full and, if so, calls the member function transfer to transfer data from the compressed-metric-data queue to mass storage. Then, the member function addEntry enters the compressed-data value supplied as an argument into the compressed-metric-data queue at the entry specified by the pointer in. The pointer in is then advanced, by a call to the member function advanceIn, the timestamp final is incremented, and the number of entries in compressed-metric-data queue is incremented.

Figure 22D:
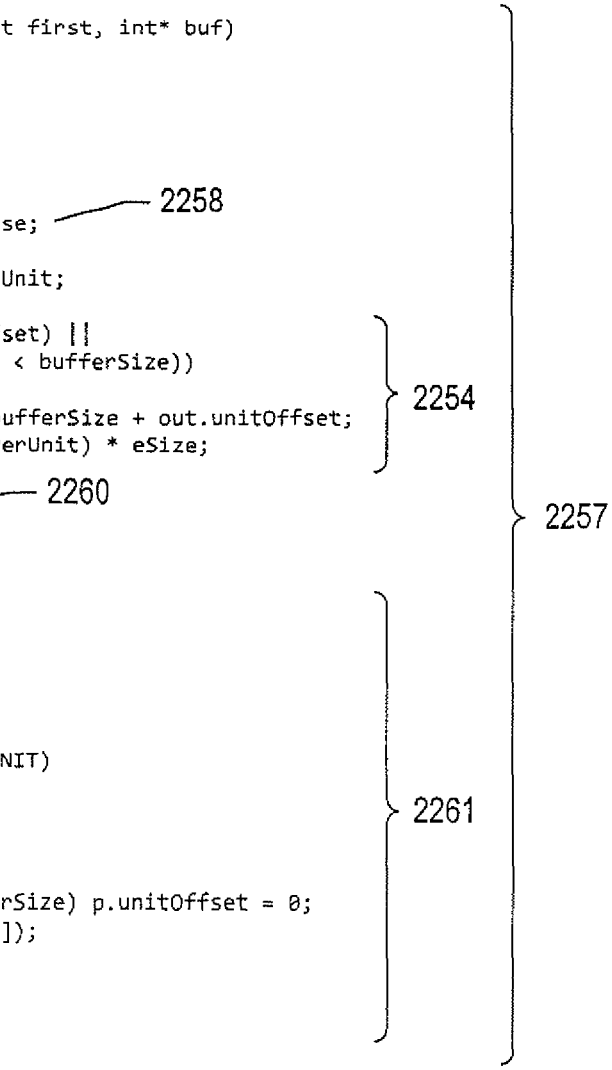

FIG. 22D provides an implementation of the public member function getEntries. The member function getEntries 2257 returns false when there are insufficient entries in the compressed-metric-data queue 2258. Otherwise, the member function getEntries sets a pointer p to reference the first requested entry 2259 and a pointer to points to the data-storage UNIT in the buffer corresponding to the entry 2260. Then, in the while-loop 2261, the member function getEntries selects entries from the compressed-metric-data queue and places them into the specified buffer buf.

FIG. 22E provides an implementation for the member function transfer. The member function transfer attempts to transfer a number of data entries from the compressed-metric-data queue to mass-storage devices equal to the value stored in the data member tSize. If there are insufficient entries in the compressed-metric-data queue, then the member function transfer transfers the remaining data entries in the compressed-metric-data queue 2263. When there are sufficient data entries in the compressed-metric-data queue from the entry pointed to by the data member out to the end of the buffer 2264, the entries are transferred by a single call to the transfer function tFunction, followed by advancing the pointer out, incrementing the timestamp initial, and decrementing the number of entries in the queue 2265. Otherwise, the requested number of entries are transferred in two calls to the transfer function (Function 2266 and 2267.

FIG. 22F provides an implementation of the member functions editEntry and flush. The member function editEntry 2268 sets a pointer p to point to the UNIT containing the entry that is to be edited 2269 and then enters a new value for the entry using the member function enter 2270. The member function flush 2271 repeatedly calls the member function transfer to transfer all entries remaining in the compressed-metric-data queue to mass storage.

The present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed methods and systems. As discussed above, a wide variety of different compressed-data formats and compressed-data encodings can be used for various different types of metrics. As mentioned above, the implementations described above with reference to FIGS. 21A-C and FIGS. 22A-F assume that data points for a single metric-data set is being stored and compressed. Multiple metric-data sets can be handled in similar fashion by multiplexing the raw-metric-data queue and compressed-metric-data queue as well as the compression-and-processing subsystem. Alternatively, a raw-metric-data queue and a compressed-metric-data queue can be allocated for each metric-data set, with the compression-and-processing subsystem demultiplexing received data points for multiple metric-data sets and forwarding compressed data points for each metric-data set to a different pair of raw and compressed metric-data queues. In yet alternative implementations, a separate compression-and-processing subsystem may be allocated for each metric-data set. Other types of data-storage data structures may be used in place of circular queues. Although peak data points were discussed, above, compressed-data encoding methods may encode trough data points with particular, identifying values in addition to peak data points, and may also use compressed-data values that identify other types of data points of significance, including inflection points.

The invention claimed is:

1. A metric-data collection-and-storage subsystem within a distributed computer system, the metric-data collection-and-storage subsystem comprising:
   one or more processors;
   one or more memories;
   one or more data-storage devices;
   one or more virtual machines instantiated by computer instructions stored in one or more of the one or more memories and executed by one or more of the one or more processors that together collect and store metric data by
      receiving and storing metric data points in memory,
      extracting previously received metric data points from memory, compressing the extracted metric data points, and storing the compressed metric data points in memory, the compressed metric data points each comprising a fixed number n of bits, where n is less than or equal to 8; and
      retrieving compressed metric data points from memory and storing the retrieved compressed metric data points in one or more of the one or more data-storage devices.

2. The metric-data collection-and-storage subsystem of claim 1 wherein each metric data point is representable as a timestamp/metric-data-value pair.

3. The metric-data collection-and-storage subsystem of claim 2 wherein the metric-data collection-and-storage subsystem provides, to a requesting data-analysis subsystem:
   uncompressed metric data points, extracted from memory, corresponding to a first time window;
   compressed data points, extracted from memory, corresponding to a second time window earlier in time than the first time window; and
   compressed data points, extracted from mass storage, corresponding to a third time window earlier in time than the second time window.

4. The metric-data collection-and-storage subsystem of claim 2 wherein each metric data point is compressed to a single one-bit value that indicates whether or not the metric data point is a significant metric data point.

5. The metric-data collection-and-storage subsystem of claim 4 wherein a significant data point is one of:
   a peak data point;
   a trough data point; or
   an inflection data point.

6. The metric-data collection-and-storage subsystem of claim 2 wherein a metric data point is compressed to a single two-bit value that indicates the relationship of the of the metric data point's metric-data value to the metric-data value of a preceding metric data point that precedes the metric data point in a time series of metric data points.

7. The metric-data collection-and-storage subsystem of claim 6 wherein, of the four possible numerical values of the two-bit value, a first numerical value represents an equality or an approximate equality relationship, a second numerical value represents a less-than relationship, and a third numerical value represents a greater-than relationship.

8. The metric-data collection-and-storage subsystem of claim 7 wherein a fourth numerical value represents a particular type of significant data point.

9. The metric-data collection-and-storage subsystem of claim 2
   wherein the metric-data collection-and-storage subsystem stores uncompressed metric data points in a raw-metric-data circular queue; and
   wherein the metric-data collection-and-storage subsystem stores compressed metric data points in a compressed-metric-data circular queue.

10. The metric-data collection-and-storage subsystem of claim 9 wherein multiple compressed metric data points are stored in each unit of data storage, such as a 32-bit word or a 64-bit word, within a the compressed-metric-data circular queue.

11. A method that efficiently stores metric data points in a computer system having one or more processors; one or more memories; and one or more data-storage devices, the method comprising:
   receiving and storing the metric data points in memory,
   extracting previously received metric data points from memory, compressing the extracted metric data points, and storing the compressed metric data points in memory, the compressed metric data points each comprising a fixed number n of bits, where n is less than or equal to 8; and retrieving compressed metric data points from memory and storing the retrieved compressed metric data points in one or more of the one or more data-storage devices.

12. The method of claim 11 wherein each metric data point is representable as a timestamp/metric-data-value pair.

13. The method of claim 12 further comprising:
providing, to a requesting data-analysis subsystem, uncompressed metric data points corresponding to a first time window;
compressed data points, extracted from memory, corresponding to a second time window earlier in time than the first time window; and
compressed data points, extracted from mass storage, corresponding to a third time window earlier in time than the second time window.

14. The method of claim 12 further comprising compressing each metric data point is compressed to a single one-bit value that indicates whether or not the metric data point is a significant metric data point.

15. The method of claim 14 wherein a significant data point is one of:
a peak data point;
a trough data point; or
an inflection data point.

16. The method of claim 12 further comprising compressing each metric data point to a single two-bit value that indicates the relationship of the of the metric data point's metric-data value to the metric-data value of a preceding metric data point that precedes the metric data point in a time series of metric data points.

17. The method of claim 16 wherein, of the four possible numerical values of the two-bit value, a first numerical value represents an equality or an approximate equality relationship, a second numerical value represents a less-than relationship, and a third numerical value represents a greater-than relationship.

18. The method of claim 17 wherein a fourth numerical value represents a particular type of significant data point.

19. A physical data-storage device that stores a sequence of computer instructions that, when executed by one or more processors within one or more computer systems that each includes one or more processors, one or more memories, and one or more data-storage devices, control the one or more computer systems to:
receive and store the metric data points in memory,
extract previously received metric data points from memory, compress the extracted metric data points, and store the compressed metric data points in memory, the compressed metric data points each comprising a fixed number n of bits, where n is less than or equal to 8; and
retrieve compressed metric data points from memory and store the retrieved compressed metric data points in one or more of the one or more data-storage devices.

20. The physical data-storage device of claim 19 wherein the computer instructions further control the one or more computer systems to:
provide, to a requesting data-analysis subsystem, uncompressed metric data points corresponding to a first time window;
compress data points, extracted from memory, corresponding to a second time window earlier in time than the first time window; and
compress data points, extracted from mass storage, corresponding to a third time window earlier in time than the second time window,
receiving and storing metric data points in memory,
compressing previously received metric data points and storing the compressed metric data points in memory, the compressed metric data points each comprising a fixed number n of bits, where n is less than or equal to 8; and
retrieving compressed metric data points from memory and storing the retrieved compressed metric data points in one or more of the one or more data-storage devices.

* * * * *